US012132332B2

(12) United States Patent
Shin

(10) Patent No.: US 12,132,332 B2
(45) Date of Patent: Oct. 29, 2024

(54) METHOD AND APPARATUS FOR AUTOMATICALLY AUTHENTICATING ELECTRIC VEHICLE CHARGING USER BASED ON BLOCKCHAIN

(71) Applicants: Hyundai Motor Company, Seoul (KR); Kia Corporation, Seoul (KR); Myongji University Industry and Academia Cooperation Foundation, Gyeonggi-do (KR)

(72) Inventor: Min Ho Shin, Gyeonggi-do (KR)

(73) Assignees: Hyundai Motor Company, Seoul (KR); Kia Corporation, Seoul (KR); Myongji University Industry and Academia Cooperation Foundation, Gyeonggi-do (KR)

( * ) Notice: Subject to any disclaimer, the term of this patent is extended or adjusted under 35 U.S.C. 154(b) by 477 days.

(21) Appl. No.: 17/459,147

(22) Filed: Aug. 27, 2021

(65) Prior Publication Data
US 2022/0069602 A1    Mar. 3, 2022

Related U.S. Application Data

(60) Provisional application No. 63/070,943, filed on Aug. 27, 2020.

(51) Int. Cl.
H02J 7/00     (2006.01)
B60L 53/65    (2019.01)
(Continued)

(52) U.S. Cl.
CPC .......... *H02J 7/00045* (2020.01); *B60L 53/65* (2019.02); *B60L 53/665* (2019.02); *B60L 53/68* (2019.02);
(Continued)

(58) Field of Classification Search
CPC .... H02J 7/00045; B60L 53/65; B60L 53/665; B60L 53/68; H04L 9/3239; H04L 9/3263;
(Continued)

(56) References Cited

U.S. PATENT DOCUMENTS

2017/0358041 A1* 12/2017 Forbes, Jr. ............... G05D 3/12
2019/0215404 A1*  7/2019 Stöcker ................... H04W 8/02
(Continued)

FOREIGN PATENT DOCUMENTS

CN    110266793 A      9/2019
CN    111341024 A  *   6/2020
(Continued)

OTHER PUBLICATIONS

EESR from the European Patent Office for European Patent Application No. 21193545.7, dated Jul. 11, 2022, 2 pages.

*Primary Examiner* — Richard Isla
*Assistant Examiner* — Manuel Hernandez
(74) *Attorney, Agent, or Firm* — Fox Rothschild LLP

(57) ABSTRACT

A method and apparatus are configured to automatically authenticate an electric vehicle (EV) charging user based on blockchain. A vehicle-to-grid (V2G) operator generates a smart contract for a specific EV or an EV user on a blockchain, and a mobility operator (MO) or a charge point operator acquire an access control authority to the blockchain. The EV user provides an authentication identifier to the MO. The MO generates an account identifier based on the authentication identifier, generates a contract on the blockchain based on the authentication identifier, the account identifier, an expiration date of the account identifier, and the activity status of the account identifier, and transmits contract information including the account identifier corresponding to the authentication identifier, the expi-
(Continued)

ration date of the account identifier, and the activity status of the account identifier to the EV user.

20 Claims, 11 Drawing Sheets

(51) Int. Cl.
*B60L 53/66* (2019.01)
*B60L 53/68* (2019.01)
*H04L 9/32* (2006.01)
*H04L 9/40* (2022.01)
*H04L 9/00* (2022.01)
*H04W 4/44* (2018.01)
*H04W 12/069* (2021.01)

(52) U.S. Cl.
CPC .......... *H04L 9/3239* (2013.01); *H04L 9/3263* (2013.01); *H04L 63/0823* (2013.01); *H04L 9/50* (2022.05); *H04L 63/12* (2013.01); *H04W 4/44* (2018.02); *H04W 12/069* (2021.01); *Y04S 30/14* (2013.01)

(58) Field of Classification Search
CPC ....... H04L 9/50; H04L 63/0823; H04L 63/12; H04W 4/44; H04W 12/069; Y04S 30/14

USPC ........................................................ 320/109
See application file for complete search history.

(56) References Cited

U.S. PATENT DOCUMENTS

| | | |
|---|---|---|
| 2020/0148071 A1 | 5/2020 | Singh et al. |
| 2020/0200824 A1 | 6/2020 | Narayanaswami |
| 2020/0238847 A1 | 7/2020 | Wiseman et al. |
| 2021/0152035 A1* | 5/2021 | Smith ...................... H02J 50/20 |
| 2022/0219560 A1* | 7/2022 | Lu ........................... B60L 53/62 |

FOREIGN PATENT DOCUMENTS

| | | | | |
|---|---|---|---|---|
| CN | 113129518 A | * | 7/2021 | .............. B60L 53/30 |
| CN | 113386610 A | * | 9/2021 | |
| CN | 113400962 A | * | 9/2021 | .............. B60L 50/60 |
| CN | 111422078 B | * | 11/2021 | .............. B60L 53/00 |
| CN | 116684099 A | * | 9/2023 | |
| DE | 102020203704 A1 | * | 9/2021 | |
| DE | 102020120945 A1 | * | 2/2022 | |
| EP | 3671618 A1 | * | 6/2020 | |
| EP | 3812197 A1 | * | 4/2021 | .............. B60L 53/10 |
| KR | 20220027781 A | * | 3/2022 | |
| WO | WO-2018046105 A1 | * | 3/2018 | ............ B60L 53/305 |

* cited by examiner

METHOD AND APPARATUS FOR AUTOMATICALLY AUTHENTICATING ELECTRIC VEHICLE CHARGING USER BASED ON BLOCKCHAIN

CROSS-REFERENCE TO RELATED APPLICATION

The present application claims under 35 U.S.C. § 119(a) the benefit of U.S. Provisional Patent Application No. 63/070,943 filed on Aug. 27, 2020 with the U.S. Patent and Trademark Office and Korean Patent Application No. 10-2021-0112033 filed on Aug. 25, 2021 with the Korean Intellectual Property Office, the entire contents of which are incorporated herein by reference.

BACKGROUND

(a) Technical Field

The present disclosure relates to a method and apparatus for authenticating a charging user of an electric vehicle, more particularly, to the method and apparatus for automatically authenticating an electric vehicle charging user based on a blockchain.

(b) Description of the Related Art

An electric vehicle (EV) is driven by an electric motor powered by a battery and has advantages over conventional vehicles of reducing pollutants such as exhaust gas and noise, less breakdown, longer life, and simpler driving operation. An electric vehicle charging system may be defined as a system that charges a battery mounted in the electric vehicle using electric power acquired from a commercial power grid or an energy storage device. The electric vehicle charging system may include the EV and an electric vehicle supply equipment (EVSE) and may be categorized into a conductive charging system and a wireless power transfer system.

A charging station equipped with the EVSE may start the charging after a certain authentication process for the EV or the EV user. The authentication process may depend on a charging infrastructure and capabilities of the EV. One typical authentication scheme for charging the EV is a PnC scheme, in which the authentication and payment are automatically performed using a contract certificate stored in the EV. Another authentication scheme for charging the EV may use external identification means (EIM) such as a credit card, a debit card, cash, and/or a smartphone application for an identification and authentication of the user and a payment of charging fee.

In the case of conductive charging, the PnC scheme refers to a plug-and-charge scheme by which the authentication and the EV charging are performed automatically by simply plugging a conductor extending from the charging station to the EV. In the case of wireless power transfer, the PnC scheme refers to a park-and-charge scheme by which the authentication and the EV charging are performed automatically by simply parking the EV on a charging spot of a charging station. The PnC enables all processes such as the EV user authentication, charging, and billing to be performed automatically during a charging session. Conventionally, an EV owner who wishes to use a PnC service has to conclude a service contract with a mobility operator (MO) before or after the EV is handed over from a manufacturer to the owner. After concluding the contract, a contract certificate is installed in the EV when the EV is charged for the first time. Afterwards, the EV owner may receive the PnC service from charging stations associated with the MO.

Meanwhile, as a number of electric vehicles is increasing rapidly, a charging infrastructure for the same is expanding rapidly also. In addition, research and development is being conducted to provide users with a more convenient and safe charging environment. In particular, research on the PnC and data communications for implementing the PnC is directed to enable various additional services for the EV such as an EV diagnosis, a firmware update, and a certificate update. However, the infrastructure for enhancing the convenience of the EV user may also increase security threats. In particular, the EVSE or charging equipment in the charging station may be an important node from a security point of view because the charging equipment is connected to a plurality of independent networks. That is, the charging equipment is not only connected to a power grid, but also connected to a charging station management system of a charge point operator (CPO) or the mobility operator through Internet, and to the EV through a wireless LAN (WAN) and powerline communications. Thus, the charging equipment may be vulnerable to security attacks.

A conventional PnC authentication procedure is performed through communication with transport layer security (TLS) and uses a digital signature based on a public key infrastructure (PKI). Thus, all entities associated with the charging and the authentication have to acquire and retain their certificates, and systems for issuing and managing these certificates need to be added in the PnC infrastructure. Further, the conventional PnC authentication procedure uses an expensive PKIs including a MO PKI, a CPO PKI, and an original equipment manufacturer (OEM) PKI and requires a complex backend system. In particular, according to the conventional PnC authentication procedure, the installation of certificates for all the relevant entities may be too complicated and inefficient, use cases for a vehicle sharing and an EV ownership assignment may not be supported, and a certificate provisioning service and a directory service for the authentication and authorization procedure may excessively rely on centralized trusts.

Therefore, there is a need for a new PnC method which may facilitate the issuance and management of the certificate and uses a secure authentication system in the EV charging environment while providing conveniences to the EV user.

SUMMARY

Provided is a method of effectively adopting a security feature of a blockchain for automatic authentication of an electric vehicle (EV) charging user.

Provided is a method and apparatus for automatically authenticating the EV charging user based on the blockchain which is configured to retrieve certificate status information and account status information of the EV or an EV user in real-time while facilitating issuance and management of a certificate and providing an EV charging system with a secure authentication system environment.

According to an aspect of an exemplary embodiment of a blockchain-based automatic authenticating method of an electric vehicle (EV) charging user, a vehicle-to-grid (V2G) operator generates a smart contract for a specific electric vehicle (EV) or an EV user based on a blockchain on a network, and a mobility operator (MO) or a charge point operator (CPO) acquires an access control authority to the blockchain. The EV user provides an authentication identifier (AuthID) to the MO. The MO generates an account identifier (eMAID) based on the authentication identifier from the AuthID, generates a contract on the blockchain based on the authentication identifier, the account identifier, an expiration date of the account identifier, and an activity status of the account identifier, and transmits contract information including the account identifier corresponding to the authentication identifier, the expiration date of the account identifier, and the activity status of the account identifier to the EV user.

In other words, according to a blockchain-based automatic authenticating method according to an aspect of an exemplary embodiment, when the V2G operator generates a smart contract for a specific EV or EV user on the blockchain, the MO acquires an access control right to the blockchain; generates an account identifier based on an authentication identifier received from the EV or the EV user; generates an individual contract or an individual smart contract on the blockchain based on the authentication identifier and the account identifier; and transmits contract information corresponding to the authentication identifier to the EV or the EV user.

The blockchain-based automatic authentication method may further include: receiving a payment details request message from the EV via the MO connected to an electric vehicle supply equipment (EVSE) having established a communication channel with the EV; and transmitting a payment details response message comprising payment details data to the EV.

The blockchain-based automatic authentication method may further include: receiving an authorization request message from the EV; transmitting the authentication identifier included in the authorization request message or corresponding to the authorization request message to the blockchain; receiving the account identifier corresponding to the authentication identifier from the blockchain; and transmitting an authorization response message to the EV based on the account identifier.

According to another aspect of an exemplary embodiment, a blockchain-based automatic authentication method includes: receiving, by the MO, an authentication identifier from an EV or a user terminal of an EV user; generating, by the MO, an account identifier of the EV user based on the authentication identifier; generating, by the MO, an individual contract including the authentication identifier, the account identifier, an expiration date of the account identifier, and an activity status of the account identifier in a blockchain on the network; and transmitting, by the MO, contract information including the account identifier, the expiration date, and the activity status to the EV or the user terminal.

The blockchain-based automatic authentication method may further include: generating, by a vehicle-to-grid (V2G) operator, a contract associated with the EV or the EV user on the blockchain. The blockchain may be subscribed in advance or newly started or created on a network having communication nodes by the V2G operator. The contract may be stored in a distributed ledger of the blockchain and may store a set of rules for an automatic authentication of EV charging user.

The blockchain-based automatic authentication method may further include: transmitting, by the MO, a registration request message for an address of the MO to the blockchain. The blockchain may verify the address of the MO according to a set of rules in the contract before registering the address of the MO in the distributed ledger.

The blockchain-based automatic authentication method may further include: transmitting, by a charge point operator (CPO) associated with the MO, a registration request message for an address of the CPO to the blockchain. The blockchain may verify the address of the CPO according to a set of rules in the contract before registering the address of the CPO in the distributed ledger.

The blockchain-based automatic authentication method may further include: receiving, by the CPO, a payment details request message from the EV; and transmitting, by the CPO, a payment details response message including payment details to the EV.

The blockchain-based automatic authentication method may further include: receiving, by the CPO, an authorization request message related to an automatic authentication of an EV charging user from the EV; transmitting, by the CPO, the authentication identifier included in the authorization request message or acquired based on the authorization request message to the blockchain; receiving, by the CPO, the account identifier corresponding to the authentication identifier and having a verified expiration date from the blockchain; and transmitting, by the CPO, an authorization response message to the EV based on the account identifier. The blockchain may retrieve an account identifier based on the authentication identifier and check the validity period of the account identifier.

The authentication identifier may be generated based on an EV certificate obtained by the EV from a public key infrastructure (PKI) of an original equipment manufacturer (OEM).

According to an aspect of another exemplary embodiment, a method of automatically authenticating an EV charging user performed by an EV, includes: generating an authentication identifier based on an EV certificate; transmitting the authentication identifier to an MO; establishing a communication channel with an EVSE of a CPO associated with the MO to transmit and receive signals and data to and from the EVSE; transmitting an authorization request message related to an automatic EV charging user authentication to the CPO through the communication channel; and receiving an authorization response message corresponding to the authorization request message from the CPO. The MO generates an account identifier based on the authentication identifier, generates an individual contract based on the authentication identifier, the account identifier, an expiration date of the account identifier, and an activity status of the account identifier, and transmits contract information associated with the individual contract to the EV or an EV user.

The CPO may transmit the authentication identifier included in the authorization request message or acquired based on the authorization request message to the blockchain, The CPO may transmit the authorization response message to the EV or the EV user based on the account identifier retrieved from the blockchain and having a verified expiration date.

The EV certificate may be obtained from a public key infrastructure (PKI) of an original equipment manufacturer (OEM).

When a V2G operator generates a contract related with the EV or EV user on the blockchain, the MO or the CPO may transmit a registration request message for an address of the MO or the CPO, respectively, to the blockchain. The blockchain may verify the address of the MO or the CPO according to a set of rules in the contract and register a verified address of the MO or the CPO in a distributed ledger.

According to another aspect of another exemplary embodiment, a blockchain-based the automatic authentication apparatus that may be included in at least one of an MO or a CPO, includes: a processor and a memory storing at least one instruction to be executed by the processor. The at least one instruction, when executed by the processor, may cause the processor to: receive an authentication identifier from an EV or a user terminal of or EV user; generate an account identifier of the EV user based on the authentication identifier; generate an individual contract, on the blockchain, based on the authentication identifier, the account identifier, an expiration date of the account identifier, and an activity status of the account identifier; and transmit contract information including the account identifier, the expiration date of the account identifier, and the activity status of the account identifier to the EV or the user terminal.

The blockchain may be subscribed in advance or newly started or created by a V2G operator. When the V2G operator generates a smart contract associated with the EV or the EV user on the blockchain. The smart contract may store a set of rules for an automatic authentication of EV charging user in a distributed ledger.

The at least one instruction, when executed by the processor, may further cause the processor to: transmit a registration request message for an address of the MO or the CPO to the blockchain. The blockchain may verify the address of the MO or the CPO according to a set of rules in the smart contract and to register in a distributed ledger.

The at least one instruction, when executed by the processor may further cause the processor to: receive a payment details request message from the EV; and transmit a payment details response message to the EV.

The at least one instruction, when executed by the processor, may further cause the processor to: receive an authorization request message related to an automatic authentication of an EV charging user from the EV; transmit the authentication identifier included in the authorization request message or acquired based on the authorization request message to the blockchain; receive the account identifier corresponding to the authentication identifier and having a verified expiration date from the blockchain; and transmit an authorization response message to the EV based on the account identifier.

According to an exemplary embodiment of the present disclosure, the contract information of a smart contract generated by the V2G operator is linked to information of the EV user to establish an automatic authentication system for an EV charging user based on the blockchain. Accordingly, it is possible to provide real-time certificate status information and real-time account status information of the EV or the EV user to relevant entities of the EV charging system.

In addition, the registration information of the MO and the registration information for the certificate provisioning service (CPS) of the charge point operator (CPO) and/or the V2G certification authority are managed based on the blockchain. Accordingly, the new method of automatically authenticating EV charging user does not require the certificate chain of the MO PKI and the verification authority (VA) for an online certificate provisioning service (CPS).

Since a certificate provisioning service and a separate directory service for the authentication and authorization are not used, the system according to an exemplary embodiment does not require a centralized trust entity. In addition, there is no single point of failure (SPOF) where the entire system halts when a certain system or entity does not work. Further, the exemplary embodiment does not require any user certificate to be installed in the vehicle.

The blockchain-based authentication method and apparatus according to the present disclosure may efficiently support use cases for a vehicle sharing or a vehicle transfer and make the PnC architecture simpler, and may be applicable without a change in PnC-related international standards currently being used.

BRIEF DESCRIPTION OF THE DRAWINGS

In order that the disclosure may be well understood, there will now be described various forms thereof, given by way of example, reference being made to the accompanying drawings, in which.

Figure 1:
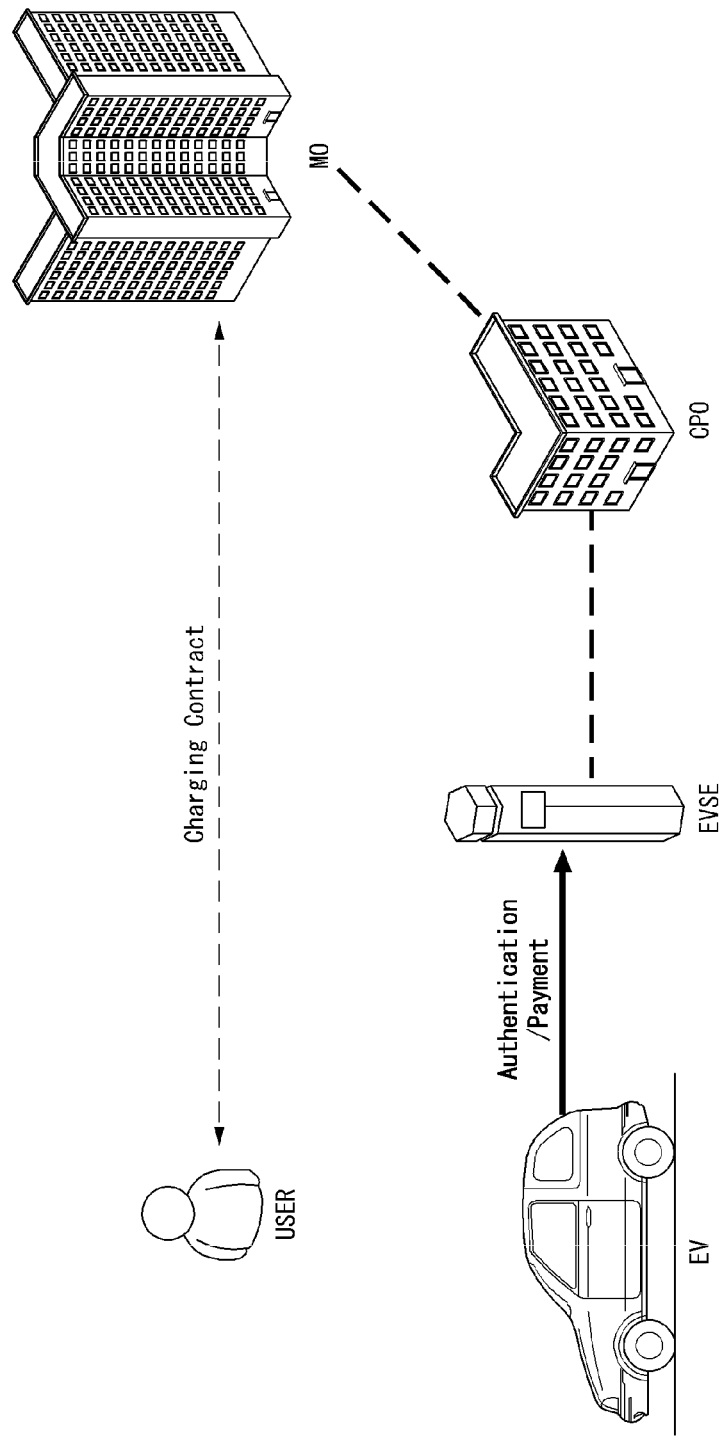
FIG. 1 is a schematic diagram for explaining a blockchain-based automatic authentication process of an electric vehicle (EV) charging user according to an exemplary embodiment of the present disclosure.

The drawings described herein are for illustration purposes only and are not intended to limit the scope of the present disclosure in any way.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

For a more clear understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure.

The terminologies are used herein for the purpose of describing particular embodiments only and are not intended to limit the disclosure. The singular forms include plural referents unless the context clearly dictates otherwise.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Hereinafter, embodiments of the present disclosure will be described in more detail with reference to the accompanying drawings. In describing the present disclosure, in order to facilitate an overall understanding thereof, the same components are assigned the same reference numerals in the drawings and are not redundantly described here. Hereinafter, exemplary embodiments of the present disclosure will be described in detail with reference to the accompanying drawings.

In the following description and the accompanied drawings, detailed descriptions of well-known functions or configuration that may obscure the subject matter of the present disclosure will be omitted for simplicity. Also, it is to be noted that the same components are designated by the same reference numerals throughout the drawings.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Wireless power charging system (WCS)": A system for wireless power transfer and control of interactions including sequences for an alignment and communications between a ground assembly (GA) and a vehicle assembly (VA) or between a primary device and a secondary device.

"Wireless power transfer (WPT)": A transfer of electric power from a power source such as a utility, the power grid, an energy storage device, a fuel cell generator through a contactless channel such as electromagnetic induction and resonance to the EV or a transfer of the electric power from the EV to a power source.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information related to certification on EVs, interval of power consumption measurements, and tariff.

"Smart charging": A system in which EVSE and/or PEV communicate with power grid to optimize charging ratio or discharging ratio of EV by reflecting capacity of the power grid or expense of use.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupling": A magnetic coupling between two coils. One of the two coils may refer to a ground assembly (GA) coil, and the other one of the two coils may refer to a vehicle assembly (VA) coil.

"Original equipment manufacturer (OEM)": An EV manufacturer or a server operated by the EV manufacturer, and may include a certification authority (CA) that issues an OEM root certificate.

"V2G operator (V2G operator)": A primary actor participating in the V2G communication using a transmission protocol. The V2G operator may be an entity starting a blockchain on a network for automatic authentication of the EV or the EV user and generating a contract (or a smart contract) on the blockchain, and may include at least one of a trusted certificate authority or a trusted certificate server.

"Mobility operator (MO)": An entity within a PnC architecture that has a contractual relationship with the EV user regarding charging, authorization and settlement to allow the EV user to charge the battery of the EV at a charging station.

"Charge service provider (CSP)": An entity that manages and authenticates the credentials of the EV user and provides billing and other value-added services to customers. The CSP may be a particular type of the mobility operator (MO) or may be implemented in a form combined with the MO.

"Charging station (CS)": A facility or a physical device that has one or more electric vehicle supply equipment and actually carrying out charging for the EV.

"Charging station operator (CSO)": An entity connected to the power grid and manages electricity to supply power requested by the EV. The CSO may have a same meaning as a charge point operator (CPO) or may be included in the CPO depending on a context.

"Clearing house (CH)": An entity mediating between MOs, CSPs, and CSOs, in particular, regarding the authorization, billing, and settlement for a roaming between two settlements or between two clearing parties.

"Roaming": Information exchange and related provision and scheme that allow the EV user to access a charging service provided by multiple CSPs or CSOs belonging to a plurality of mobility networks by using a single credential and contract.

"credential": A physical or digital asset attesting the identity of an EV or an EV owner. It may include a password that is cryptographic information used to verify the identity, a pair of a public key and a private key used in a public key encryption algorithm, a public key certificate issued by a certification authority, and information of a trusted root certification authority.

"Certificate": An electronic document that binds a public key to an identifier (ID) by a digital signature.

"Service session": A set of services related to the EV charging at a timing assigned to a certain customer in a certain timeframe with a unique identifier.

"e-Mobility Account Identifier (eMAID)": A unique identifier linking an EV certificate to a payment account of an EV owner. In an exemplary embodiment, the eMAID may include an identifier of an EV certificate or an identifier of a provisioning certificate.

"Blockchain-based PnC (BCPnC)": An automatic charging that an actual power transfer is performed without an intervention of the EV user or the other human operator according to a plug-and-charge or park-and-charge model, in particular, the authentication is performed based on the blockchain.

The terms "blockchain-based EV charging user automatic authentication" and "automatic authentication of EV charging user based on blockchain" as used herein may refer to an authentication of an EV charging which proceeds with an exchange of signals or data between the CPO, the MO, the EV, and the EV user or a terminal of the EV user based on a blockchain and a contract registered in the blockchain by the V2G operator, for example, for the EV that needs to be charged by the PnC method.

Hereinbelow, exemplary embodiments of the present disclosure will be described in detail with reference to the accompanied drawings.

FIG. 1 is a schematic diagram for explaining a blockchain-based automatic authentication process of an electric vehicle (EV) charging user according to an exemplary embodiment of the present disclosure. An apparatus for automatically authenticating an EV charging user based on a blockchain (hereinbelow, referred to as "blockchain-based automatic authentication apparatus") is interfaced with at least one of a mobility operator (MO) or a charge point operator (CPO). The blockchain-based automatic authentication apparatus may be an electric vehicle supply device, also referred to as electric vehicle supply equipment (EVSE). In a state that an EV to be charged according to the blockchain-based automatic authentication process according to an exemplary embodiment is connected to the EVSE through a communication channel, the blockchain-based automatic authentication apparatus may acquire an access authority to a predetermined blockchain, generate an account identifier based on an identifier (hereinbelow, referred to as "authentication identifier") acquired from either the EV or the EV user, generate a contract on the blockchain based on the authentication identifier and an account identifier, and transmit contract-related information corresponding to the authentication identifier to at least one of the EV or the EV user.

Before the communication channel between the EV and the EVSE is established, a vehicle-to-grid (V2G) operator may generate a contract (hereinbelow, referred to as "smart contract") for a specific EV or EV user on the blockchain. The blockchain may be one started or newly formed by the V2G operator for supporting a charging contract including the automatic authentication of the EV charging user.

The authentication identifier may be an identifier of an EV certificate or an identifier of a provisioning certificate. The account identifier may be an identifier of a user account. The contract-related information may include the account identifier corresponding to the authentication identifier, an expiration date of the account identifier, and an activity status of the account identifier. The activity status may have a value indicating 'true' if the account identifier is valid while having a value indicating 'false' if the account identifier is invalid.

In addition, the automatic authentication apparatus may receive a message requesting payment details associated with a payment for the charging from the EV through the communication channel and transmit a response message for the request message to the EV. The response message may include information on the payment details. Further, the automatic authentication apparatus may receive an authentication request message requesting the authentication of the EV charging user from the EV through the communication channel, transmit an authentication identifier included in the authentication request message or corresponding to the authentication request message to the blockchain, obtain a valid account identifier corresponding to the authentication identifier from the blockchain, and transmit an authentication response message to the EV or the EV user based on the valid account identifier.

A registered mobility operator (MO) may register an account identifier that matches the authentication identifier of the EV user in advance in the blockchain before a charging of the EV. To this end, the BCPnC device or an application server connected to the BCPnC device may provide a decentralized application interface (DApp interface) to each MO for assisting the registration of the account identifier.

According to the present embodiment, the registration information of the MO and the registration information of a certificate provisioning service (CPS) and/or the V2G operator certification authority are managed based on the blockchain. Thus, an MO public key infrastructure (PKI) and a verification authority (VA) for an online CPS are not required, and the PnC architecture may be simplified.

Further, since the certificate provisioning service and any separate directory service for the authentication and authorization procedure are not required, the present embodiment is advantageous in that a centralized trust entity is obviated, there is no single point of failure (SPOF), and any user certificate installed in the vehicle is not required, and the PnC environment has improved security characteristics and a simple architecture.

A conventional authentication procedure for EV charging will now be described briefly with reference to the comparative examples shown in FIGS. 2 and 3.

When an EV is to be charged at a charging station by autonomous driving or according to manipulation of a driver, the EV may send a first message to the EVSE, to select a payment method between a manual payment using external identification means (EIM) such as a credit card, a debit card, cash, a smartphone application, and a membership card and an automatic method using the plug-and-charge or park-and-charge (PnC). The first message may include a payment service selection message, PaymentServiceSelectionRes. The EV includes an EV communication controller (EVCC), and the EVSE includes a supply equipment communication controller (SECC).

When the PnC is selected, the EV may send a second message including an e-mobility account identifier (eMAID) and a contract certificate to the SECC. The second message may include a PaymentDetailsReq message requesting information on the payment details. The contract certificate is a certificate issued for the EVCC by a subordinate certification authority (Sub-CA) of an eMobility service provider (eMSP). The contract certificate may be provided to the EV through the SECC and/or a secondary actor (SA) and may be used to verify a signature generated by the EVCC.

The secondary actor may authorize the EV for the charging through a certificate provisioning service (CPS) based on an e-mobility contract associated with the MO using the eMAID which is one main fields of the contract certificate. The secondary actor may include the CPO and the MO, and may further include another value-added service provider. If there is no problem with the signature generated by the EVCC, the secondary actor or the SECC may send the EV a third message including a challenge text. The third message may include a PaymentDetailsRes message providing the information on the payment details. The EV may sign the challenge text and send a fourth message including the signed challenge text to the EVSE to proceed with the authentication for the charging process. The fourth message may include an AuthorizationReq message requesting the authentication or authorization for the charging. Upon receiving the fourth message, the EVSE may authenticate the user by checking the signature of the EV side included in the fourth message.

Through the procedure for the automatic authentication of the charging user according to the comparative example described above, the EV may prepare for the charging process, be connected to the charging device such as the EVSE of the charging station through a wired or wireless link, and be supplied with electric power to charge the battery therein. Since the procedure for the automatic authentication of the charging user according to the comparative example is performed through a secure session and messages must be exchanged based on the certificate of each entity, the procedure requires a complex backend system for issuing, managing, and updating the certificate of each entity because the procedure.

Figure 2:
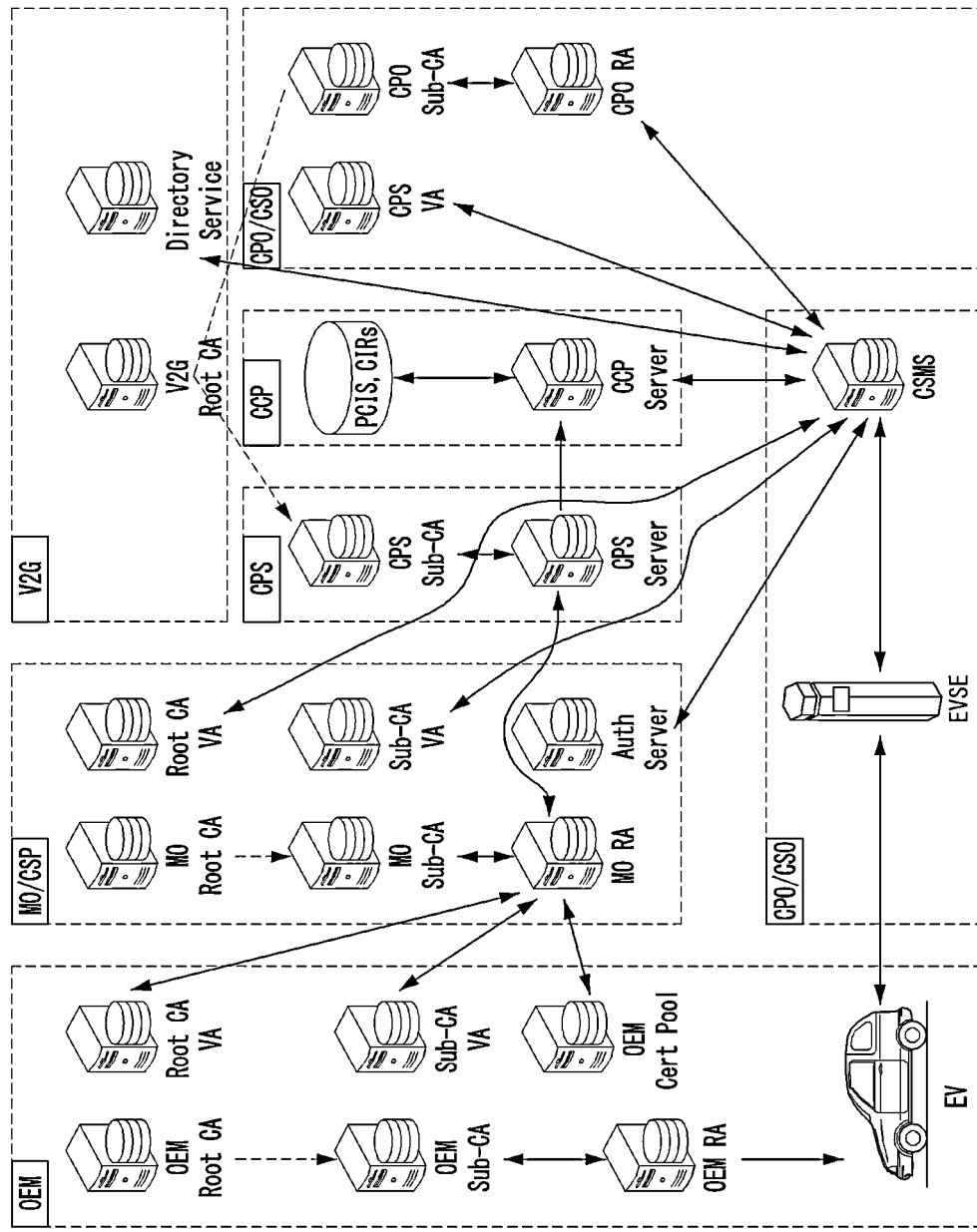
FIG. 2 illustrates an example of trust chains used in a PnC architecture applicable in a comparative example.

FIG. 2 illustrates an example of trust chains used in a PnC architecture applicable in a comparative example. In the PnC architecture for the automatic authentication of EV charging user of the comparative example shown in FIG. 2, actors engaging in the EV charging service may include the original equipment manufacturer (OEM), the mobility operator (MO) or charging service provider (CSP), the charge point operator (CPO) or charging station operator (CSO), PnC architecture components of a vehicle-to-grid (V2G) operator, and the certificate provisioning service (CPS) and a contract certificate pool (CCP) provided by them.

The EV owned or driven by the EV user is equipped with a battery that may be charged at the charging station through a wired or wireless power transfer or may supply power stored therein to the grid. The EV may have an OEM provisioning certificate installed during an assembly in the factory. A contract certificate may be installed in the EV after a vehicle purchase contract between the user and the manufacturer and a service contract between with the MO and the user are concluded. In addition, a V2G root certificate of the V2G operator may be installed in the EV.

The OEM includes a root certification authority (OEM Root CA) issuing an OEM root certificate (OEM root cert) and operating and maintaining at least one subordinate certification authority (OEM Sub-CA). When the EV is manufactured, the OEM uses an OEM intermediate certificate (OEM Sub-CA cert) to generate an OEM provisioning certificate. The OEM may enable the EV install the OEM provisioning certificate with a support of an OEM registration authority (RA). The OEM Root CA, the OEM subordinate CA, and the OEM certificate pool may be connected to a registration authority (RA) of the mobility operator (MO) to authenticate the MO or a server associated with the MO and issue certificates for them.

The mobility operator (MO) or charge service provider (CSP) is an entity having a contractual relationship with the EV user regarding the authentication and the payment for the EV charging to facilitate the charging of the EV at the charging station. In order for the EV to receive the charging service from a charging station, the charging station need to be affiliated with the MO or the MO should provide a roaming service at the charging station.

The MO includes a root certification authority (MO Root CA) issuing an MO root certificate (MO root cert) and operating and maintaining at least one MO subordinate CA (MO Sub-CA). The MO certificate chain including the MO root certificate and the MO intermediate certificates (OEM Sub-CA certs) generated by MO Sub-CAs is used to generate the contract certificate. In addition, the MO certificate chain may also be used to verify the contract certificate installed in the EV in a roaming or non-roaming environment. The MO Root CA, the MO subordinate CA, and an authentication server thereof may be connected to a charging station management system (CSMS) of the CPO or the CSO to authenticate the CSMS and issue a certificate according to an authentication result.

The CSP may authenticate the EV user, manage certificate credentials, and provide billing and other value-added services to customers. The CSP may be regarded as a special type of the MO and may be implemented to be integrated with the MO. There may be a plurality of CSPs in the system. In such a case, each CSP may be associated with one or more CSOs to form a separate charging network. The EV can receive the charging service in the PnC method at the charging station associated with the CSP or CSO having a contractual relationship with the MO to which the EV user subscribed. However, the roaming is required when the EV is to be charged in the charging station associated with the CSP or CSO having no contractual relationship with the MO to which the EV user subscribed. Each CSP may exchange information with another CSP or CSO in another charging network to enable the roaming. Additionally, the CSP may exchange information with the clearing house (CH).

The certificate provisioning service (CPS) may provide the EV or the MO registration authority (RA) with the contract certificate chain along with an encryption key used for delivering the key when the contract certificate is installed or updated in the EV through a CPS server. The CPS server may operate and maintain at least one CPS subordinate certification authority (CA CPS Sub-CA) and may be connected to a V2G Root CA through the CPS Sub-CA. The CPS is equipped with a leaf provisioning certificate (Leaf Prov cert) and a provisioning intermediate certificate (Prov Sub-CA cert). When the contract certificate is installed or updated in the EV, the CPS may provide the EV with a provisioning service that shares a public key of each MO, a Diffie-Heliman (DH: Diffie-Heliman) public key, and the eMAID along with the contract certificate chain with the EV to allow the EV to validate the contract certificate chain and verify the integrity and authenticity of contract certificate using such information.

A contract certificate pool (CCP) temporarily stores response messages to be sent during the installation or update of the contract certificate in the EV. The response messages are stored in the CCP in advance and maintained until the installation or update is completed in a consideration that a timeout period required to be observed strictly during the installation and update of the contract certificate is very short. Since there may be multiple EVs where respective contract certificates are to be installed or updated, the response messages may be maintained in a form of a directory after respective reference numbers are added. The CCP may include a CCP server connected to the CSMS and managing and maintaining a database storing the contract certificates, provisioning certificate identifiers, certificate identification registration information, and so on.

The vehicle-to-grid (V2G) operator serves as a Root CA in relation to the public key infrastructure (PKI) for the PnC architecture. The V2G Root CA acts as a top-level trust anchor, and all entities or actors shown in FIG. 3 regard the V2G Root CA as a trusted server. The V2G Root CA may be connected to the CPS subordinate certification authority (CPS Sub-CA) and the CPO subordinate certification authority (CPO Sub-CA). The V2G operator may provide a directory service to the CSMS.

The charging station operator (CSO) or the charging point operator (CPO) may operate the charging station and manages power to provide the charging service requested by the EV. The CSO may be operated, for example, by a charging station manufacturer, an EV power supply manufacturer, an electricity supplier, or a third-party entity. Regarding the PKI, the CSO or CPO may operate a subordinate certification authority (CPO Sub-CA) required to generate a SECC leaf certificate for each charging station. The CPO subordinate CA may be connected to the CSMS through a CPO registration authority (RA) to handle the registration and certification of the CSMS.

The charging station (CS) refers to a place for actually carrying out the EV charging and may include a charging facility installed in the place. The charging station may be equipped with at least one conductive charger and/or a wireless charging spot. One or more charging stations may be installed in a commercial dedicated charging space. In addition, the charging station may be located in various places such as a house garage of the EV owner, a parking area equipped with an EV charger at a gas station, and parking areas at a shopping center or an office building. The charging station may also be referred to as a 'charging point', an 'EV charging station', an 'electric charging point', and the like.

The clearing house (CH) may handle matters that require cooperation or coordination between the MOs and/or CSPs. The CH may serve as an intermediary between two settlement parties to facilitate the authentication, billing, and settlement for a roaming of the EV charging service. When the EV is to be charged at the charging station which does not belong to the charging network of the MO having the contractual relationship with the EV, the CH may be connected to the CSO or CSP associated with the MO having the contractual relationship with the EV to support the roaming service. In a situation where the roaming is required, the CH supports the CSO or CSP to conclude a temporary contract with the MO and deliver charging details record (CDR), i.e. the authorization and billing data, to the MO. The CH may also be referred to as a 'contract clearing house (CCH)', a 'mobility clearing house (MCH)', a 'roaming platform', an 'e-mobility clearing house (e-MOCH).

Though the CSO, the CPS, the MO, the CCH, and the V2G operator may seem to refer to a person or an organization of persons, these terms in this specification including the appended claims may refer to technical means or configurations implemented by hardware, software, and/or a combination thereof and are named briefly and functionally to improve the readability. Also, at least some of these actors may be server devices implemented in the hardware, the software, or a combination thereof and allowing access of other devices through a network such as Internet. Since these components are defined functionally, two or more of them may be mounted and executed in a single physical device or may be integrated into a single program. In particular, a single entity may serve the roles of both the CSO and CSP, and another single entity may serve as both the CPS and CCP. Further, one or more of the above-described components may be reorganized to have different appearances and names.

On the other hand, the PnC architecture for the automatic authentication of EV charging user described above involves many terminologies with similar concepts because the technology is directed to a field in which various industrial fields such as an automobile, power grid, energy, transportations, communications, finance, and electronic products are combined, standardization efforts have been endeavored from various viewpoints, and the standardization has been pursued by a number of international standardization organizations as well as by individual countries. In particular, the terms "charging station operator (CSO)" and the "charge point operator (CPO)" are similar in terms of their roles and functions and may denote a substantially same entity although there may be some functional differences and nuances between them. In addition, the "charge service provider (CSP)" and the "mobility operator (MO)" have similar roles and functions at least partially with each other and may be used interchangeably.

Figure 3:
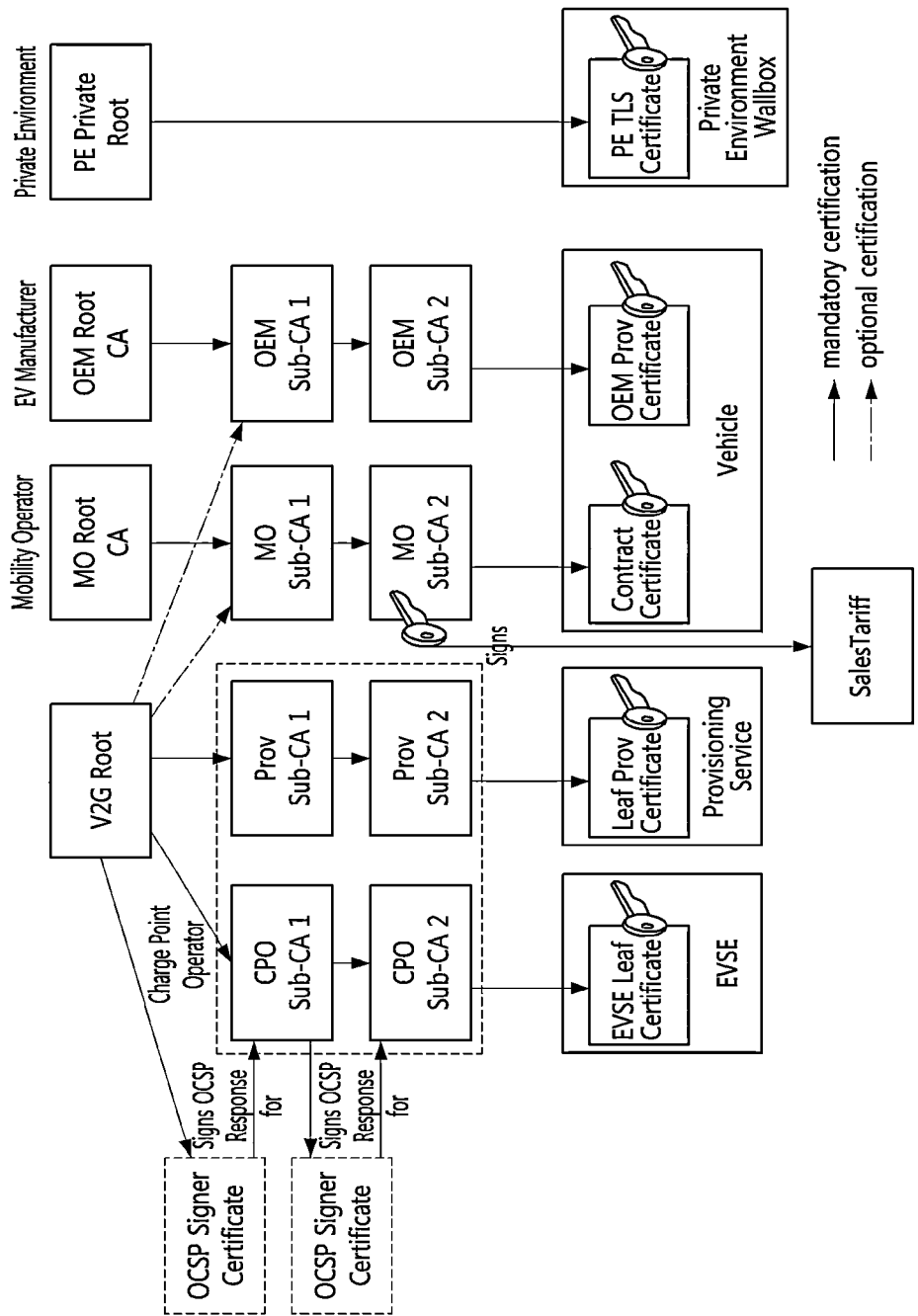
FIG. 3 illustrates a certificate structure of a public key infrastructure (PKI) applicable in the comparative example of FIG. 2.

FIG. 3 illustrates a certificate structure of a public key infrastructure (PKI) applicable in the comparative example of FIG. 2. Referring to FIG. 3, the public key infrastructure (PKI) of the comparative example required to operate the PnC provides a framework for authenticating a person or device, activating secure communications, and ensuring controlled access to resources.

Specifically, the EV manufacturer referred to as the OEM acts as the top-level trust anchor (OEM Root CA) issuing the OEM Root CA cert. The OEM may operate a first and second subordinate CAs (OEM Sub-CA 1, OEM Sub-CA 2) to issue and sign intermediate certificates (OEM Sub-CA 1 cert, OEM Sub-CA 2 cert), respectively. When an EV is manufactured, the second OEM subordinate CA (OEM Sub-CA 2) issues the OEM provisioning certificate (OEM Prov cert) using a private key corresponding to a public key contained in the intermediate certificate (OEM Sub-CA 2 cert) to install in the EV. The OEM provisioning certificate (OEM Prov cert) may be used to validate the signature of the request message during a process of requesting a certificate installation in the EV and may enable to uniquely identify the EV over a life of the EV.

The mobility operator (MO) acts as the top-level certification authority (MO Root CA) issuing the MO Root CA cert. The MO Root CA may issue a first intermediate certificate (MO Sub-CA 1 cert) of a first subordinate CA (MO Sub-CA 1) by adding its electronic signature to an identifier and a public key of the first subordinate CA (MO Sub-CA 1). The Sub-CA 1 may issue a second intermediate certificate (MO Sub-CA 2 cert) of a second subordinate CA (MO Sub-CA 2) by adding its electronic signature to an identifier and a public key of the second subordinate CA (MO Sub-CA 2). When the EV is released from the factory, the second MO subordinate CA (MO Sub-CA 2) may issue the contract certificate, based on the contract between the MO and the EV owner, using a private key corresponding to a public key contained in the second intermediate certificate (MO Sub-CA 2 cert) to be installed in the EV at the charging station that the EV first visits, for example. The contract certificate may be associated a payment account of the EV owner by a unique identifier called the e-mobility account identifier (eMAID).

The OEM provisioning certificate (OEM Prov cert) and the contract certificate, which are issued based on respective root certificates (OEM Root CA cert, MO Root CA cert) self-signed by the OEM and the MO, respectively. Are independent from the V2G root certificate (V2G Root CA cert) issued by the V2G root CA or another certificates issued based on the V2G root certificate and used by other actors. The V2G root CA may be referred to as a global trust anchor. The global trust anchor, i.e., the V2G root CA, may issue the OEM provisioning certificate (OEM Prov cert) and the contract certificate by using the V2G root certificate (V2G Root CA cert) instead of the OEM root certificate (OEM Root CA cert) and the MO root certificate (MO Root CA cert), respectively, as shown by dotted arrows in FIG. 3.

In addition, the global trust anchor may issue at least two sets of certificate chains including a certificate chain for the CPO and the CS and another certificate chain for the provisioning service.

In detail, the global trust anchor may issue a first CPO intermediate certificate (CPO Sub-CA 1 cert) by adding its electronic signature to an identifier and a public key of a first CPO subordinate CA (CPO Sub-CA 1). The first CPO subordinate CA (CPO Sub-CA 1) may issue a second CPO intermediate certificate (CPO Sub-CA 2 cert) by adding its electronic signature to an identifier and a public key of a second CPO subordinate CA (CPO Sub-CA 2). The second CPO subordinate CA (CPO Sub-CA 2) may issue an EVSE leaf certificate or a SECC leaf certificate by using a private key corresponding to a public key contained in the second CPO intermediate certificate (CPO Sub-CA 2 cert). That is, the second CPO subordinate CA (CPO Sub-CA 2) may issue the EVSE leaf certificate or the SECC leaf certificate by adding its electronic signature to an identifier and a public key of the EVSE or the SECC received from the EVSE. The EVSE leaf certificate may be used by the EV during a TLS communication setup to verify that the EV is communicating with a legitimate charging station rather than a fake charging station. The EVSE leaf certificate may be issued not only to the charging station (CS), but also to a backend server of the CSO.

The global trust anchor may issue a first intermediate provisioning certificate (Prov Sub-CA 1 cert) by adding its electronic signature to an identifier and a public key of a first provisioning subordinate CA (Prov Sub-CA 1) in the CPO. The first provisioning subordinate CA (Prov Sub-CA 1) may issue a second provisioning intermediate certificate (Prov Sub-CA 2 cert) by adding its electronic signature to an identifier and a public key of a second provisioning subordinate CA (Prov Sub-CA 2). The second provisioning subordinate CA (Prov Sub-CA 2) may issue a leaf provisioning certificate by using a private key corresponding to a public key contained in the second provisioning intermediate certificate (Prov Sub-CA 2 cert) to transmit to the CPS for a later use.

Meanwhile, each of the root CAs such as the V2G Root CA, the MO Root CA, and the OEM Root CA may issue and provide an online certificate status protocol (OCSP) certificate. In such a case, a client may access the OCSP server according to the online certificate status protocol to request and receive information regarding a revoked or unrevocated status of each certificate.

Although it is shown in FIG. 3 as if the OCSP certificate is available only for the CPO subordinate CAs (CPO Sub-CA 1, CPO Sub-CA 2) for simplicity, all the root CAs including the V2G Root CA, the MO Root CA, and the OEM Root CA may issue and use the OCSP certificate to enable to check the validity of the certificates in their own certificate chain. Besides, a private environment (PE) root CA may install a PE TLS certificate in a PE wallbox.

The comparative example of the automatic authentication of EV charging user described above requires the use of expensive PKIs including the MO PKI, CPO PKI, and OEM PKI sets and a complex backend system. As a result, the installation of the certificates for the entities related to the EV charging is complicated and inefficient. Further, use cases for a transfer and sharing of the EV may not be supported, and the certificate provisioning service and the directory service may rely on the centralized trust too much.

According to an exemplary embodiment of the present disclosure, an authentication identifier of the EV certificate is linked to contract information using a blockchain in which a smart contract generated by the power grid operator is registered to provide real-time certificate status information and real-time account status information to entities related to the EV charging and manage a registration of information to the MO and the CPS. Thus, the automatic authentication of EV charging user may obviate the MO PKI and the validation authority (VA) for the OCPS.

Figure 4:
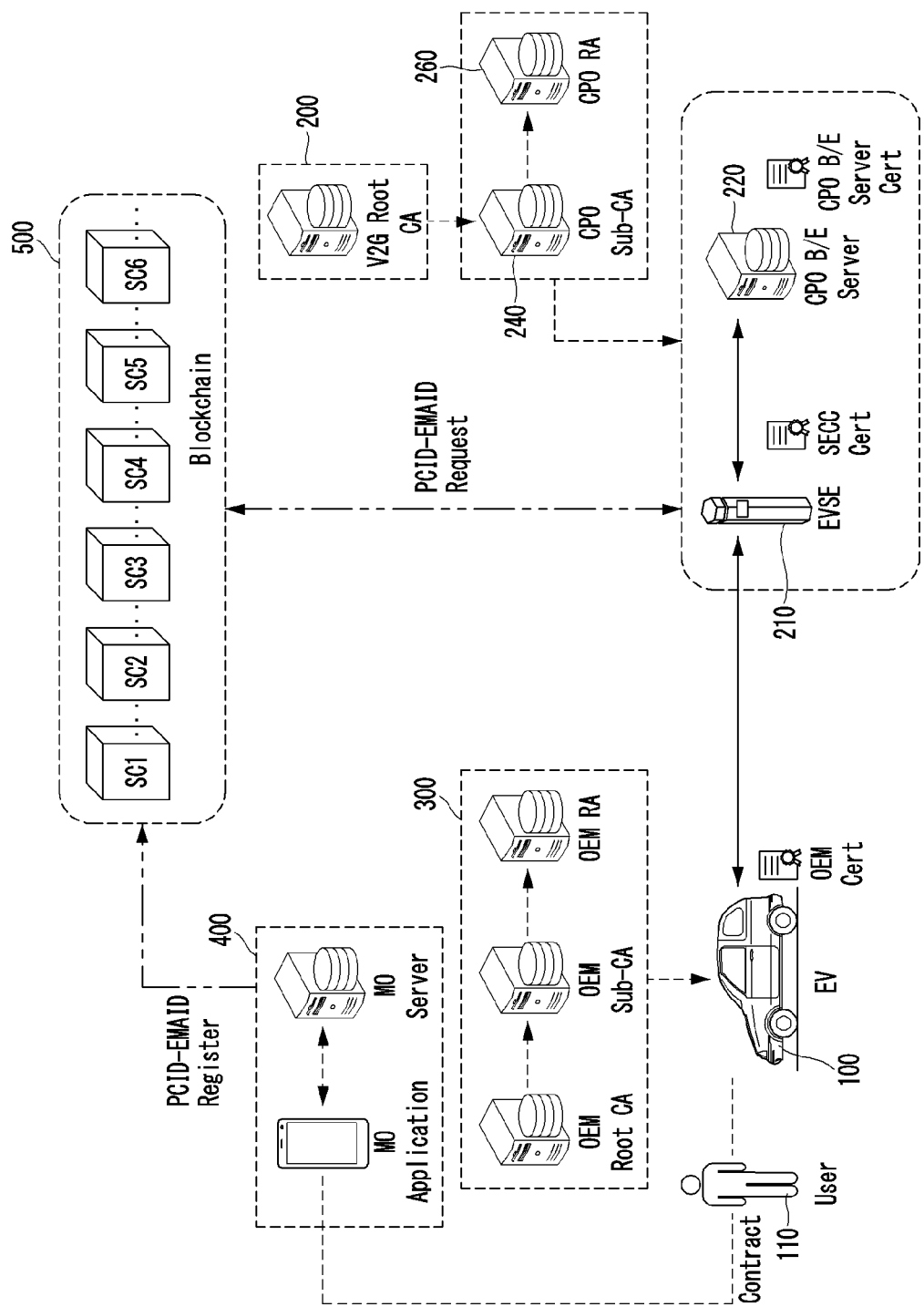
FIG. 4 is a block diagram of a blockchain-based automatic authentication system according to an exemplary embodiment of the present disclosure.
Figure 5:
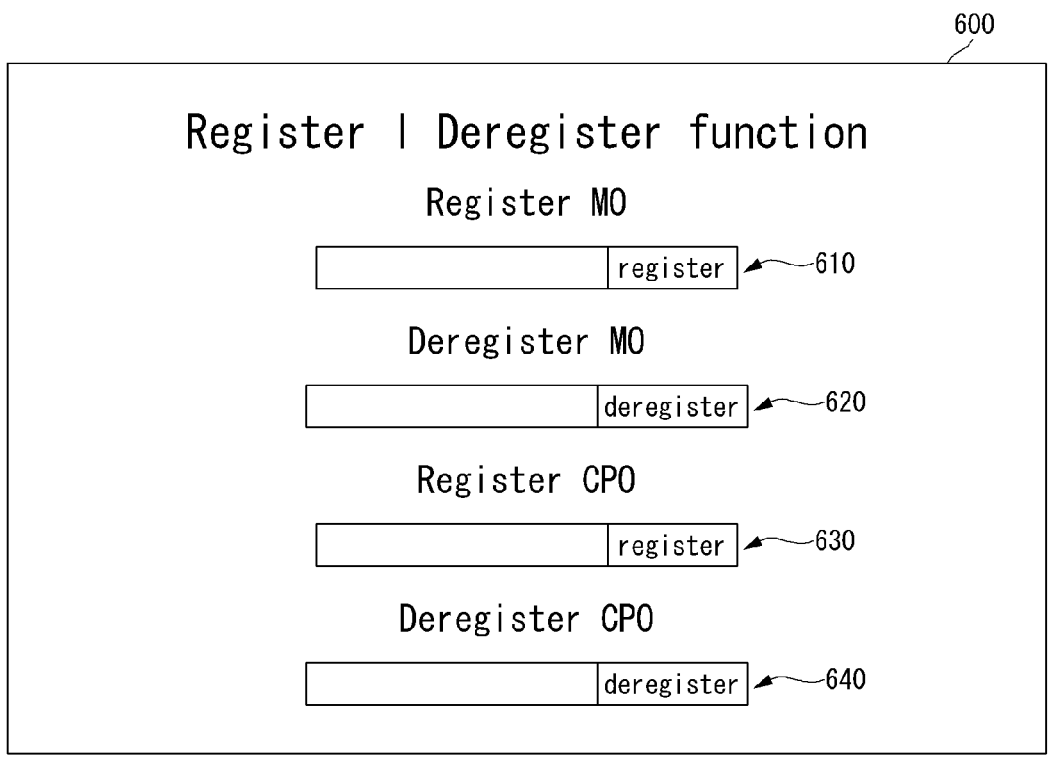
FIG. 5 illustrates an example of a decentralized application interface for registering the charge point operator (CPO) and the mobility operator (MO) in the system of FIG. 4.
Figure 6:
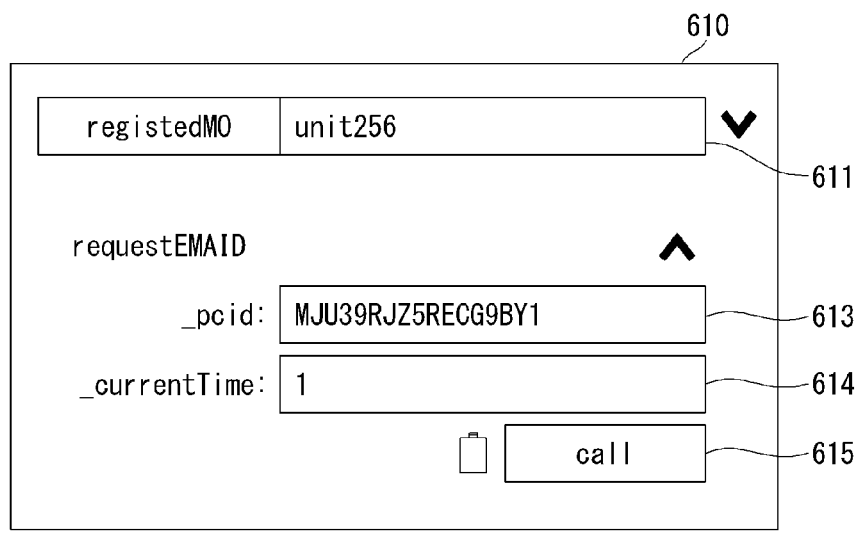
FIG. 6 illustrates an example of a decentralized application interface for registering the e-mobility account identifier (eMAID) in the system of FIG. 4.

FIG. 4 is a block diagram of a blockchain-based automatic authentication system according to an exemplary embodiment of the present disclosure. FIG. 5 illustrates an example of a decentralized application interface for registering the CPO and the MO in the system of FIG. 4. FIG. 6 illustrates an example of a decentralized application interface for registering the e-mobility account identifier (eMAID) in the system of FIG. 4.

Referring to FIG. 4, the blockchain-based automatic authentication system according to an exemplary embodiment of the present disclosure automatically authenticates an EV charging user to allow the EV charging user to receive a charging service by the PnC. Hereinbelow, the PnC assisted by the blockchain-based automatic authentication system is referred to as 'blockchain-based PnC (BCPnC)'. The blockchain-based automatic authentication system according to an exemplary embodiment of the present disclosure may include an EV 100, an EV user 110, a V2G operator 200, a CSO, a CPO 260, an EVSE 210 operated by the CSO or the CPO, an OEM PKI subsystem 300, an MO 400, and a blockchain 500.

The EV 100 may have an OEM certificate (OEM cert) or EV certificate (EV cert) received from the OEM PKI subsystem 300. The OEM certificate (OEM cert) or EV certificate (EV cert) may correspond to the OEM provisioning certificate (OEM Prov cert).

The OEM PKI subsystem 300 may include an OEM root certification authority (OEM Root CA), an OEM subordinate certification authority (OEM Sub-CA), and a registration authority (OEM RA). The OEM PKI subsystem 300 may provide the EV 100 with the OEM certificate (OEM cert) or the EV certificate (EV cert).

The EV user 110 may receive, from the electric vehicle 100, an authentication identifier (AuthID) assigned to the OEM certificate (OEM cert) or the EV certificate (EV cert) of the EV 100. The authentication identifier (AuthID) may correspond to a provisioning certificate identifier (PCID) of the OEM provisioning certificate (OEM Prov cert). The EV user 110 may cooperate in generating a contract with the MO 400 by making the EV 100 to send the authentication identifier to the MO 400

The MO 400 may include an application that may interface with a user terminal of the EV user 110 and an MO server that may interface with the MO application. The MO application may be the MO application server. The MO server may generate the account identifier based on the authentication identifier received from the MO application server. The account identifier may be the e-mobility account identifier (eMAID). The MO server may register the account identifier (eMAID) corresponding to the authentication identifier (PCID) in the blockchain 500. The MO server may include a distributed interface or an account identifier registrar. The distributed interface may be included in the account identifier registrar or may include the account identifier registrar.

For example, the distributed interface 600 may be a kind of the decentralized interface application shown in FIG. 5 and may be used to register the MO or the CPO in the blockchain. The distributed interface 600 may enable to register or deregister the MO and the CPO. The distributed interface 600 may include a pair of input window and input button 610 for MO registration, a pair of input window and input button 620 for MO deregistration, a pair of input window and input button 630 for CPO registration, and a pair of input window and input button 640 for CPO deregistration. When an identifier or address of the MO is input in the input window for MO registration in the distributed interface 600 and then a corresponding input button is selected or clicked, an MO registration request message may be sent to the blockchain. The distributed interface 600 enables the MO or the CPO to register or deregister itself in the blockchain-based EV charging user automatic authentication pool in a decentralized or distributed environment. The blockchain-based EV charging user automatic authentication pool may include at least some functions of the contract certificate pool (CCP).

Referring back to FIG. 4, the MO server may generate a contract in the blockchain 500 based on the authentication identifier, the account identifier, the expiration date of the account identifier, and the activity status of the account identifier. The contract may be referred to as an 'individual contract' or an 'individual smart contract'. The contract may be stored on the blockchain 500 to be used for providing the certificate status information or the account status information in real-time to relevant entities. The blockchain 500 may store the individual contract matching the account identifier in distributed ledgers. A plurality of distributed nodes in the blockchain 500 may store respective blocks SC1-SC6 which are small data pieces divided from the individual contract. The plurality of distributed nodes may have technical configurations suitable for forming a peer-to-peer (P2P) distributed data storage environment having a shape of a chain, for example.

In addition, the blockchain 500 may register addresses of the MO and the CPO according to a procedure or rule stored in the smart contract, generate the individual contract based on the contract-related information received from the MO. The blockchain 500 may retrieve an account identifier corresponding to a separately received authentication identifier based on the previously registered individual contracts, verify activity status of the account identifier, and provide the verified account identifier to the CPO. When a valid account identifier is not retrieved or the retrieved account identifier is invalid, the blockchain 500 may transmit, to the CPO, a response message notifying that no valid account identifier exists.

The V2G operator 200 may include a V2G root certification authority (V2G Root CA), which may act as the global trust anchor described above with reference to FIGS. 2 and 3. The CPO may include a CPO subordinate CA (CPO Sub-CA) 240 and a CPO registration authority (CPO RA) 260. The CPO subordinate CA (CPO Sub-CA) 240 may be interfaced with the CPO registration authority (CPO RA) 260 and the global trust anchor (V2G Root CA), respectively. In addition, the CPO may include the EVSE 210 or may be interfaced with the EVSE 210 via a network.

For example, when the EV 100 establishes a communication channel with a certain EVSE 210 for charging, a CPO backend server 220 may receive a payment details request message or an authorization request message from the EV 100 via the EVSE 210, the CPO backend server 220 may transmit the authentication identifier corresponding to the authorization request message to the blockchain 500 to receive account identifier corresponding to the authentication identifier. In particular, the CPO backend server 220 may receive a verification result from the blockchain 500 as to whether the account identifier retrieved by the blockchain 500 for the authentication identifier is valid or not. When a valid account identifier is received, the CPO backend server 220 may transmit an authorization message to the EV 100 via the EVSE 210.

The CPO or CPO backend server 220 may use a distributed interface 602 shown in FIG. 6 to receive the account identifier corresponding to the authentication identifier from the blockchain 500. At least a portion of the distributed interface 602 may be displayed on a screen of a display device of a computing device constituting the CPO or CPO backend server 220. The distributed interface 602 may be a type of a decentralized interface for registering the account identifier (eMAID). For example, the distributed interface 602 may include an MO information field 611 for displaying and enabling to select an identifier, unique number, or registration number of the MO, an PCID field 613 for inputting or displaying the authentication identifier (PCID) of the EV 100, a time field 614 for displaying a current time, and a call button 615 for transmitting a request to the MO to generate the account identifier (eMAID) corresponding to the authentication identifier (PCID) and register the account identifier (eMAID) to the blockchain 500.

The EVSE 210 associated with the CSO or the CPO may be equipped with a SECC certificate. The EVSE 210 may be connected to a CPO backend server 220 through a network to transmit and receive signals and data to and from the CPO backend server 220. The CPO backend server 220 may be equipped with a CPO backend server certificate.

Figure 7A:
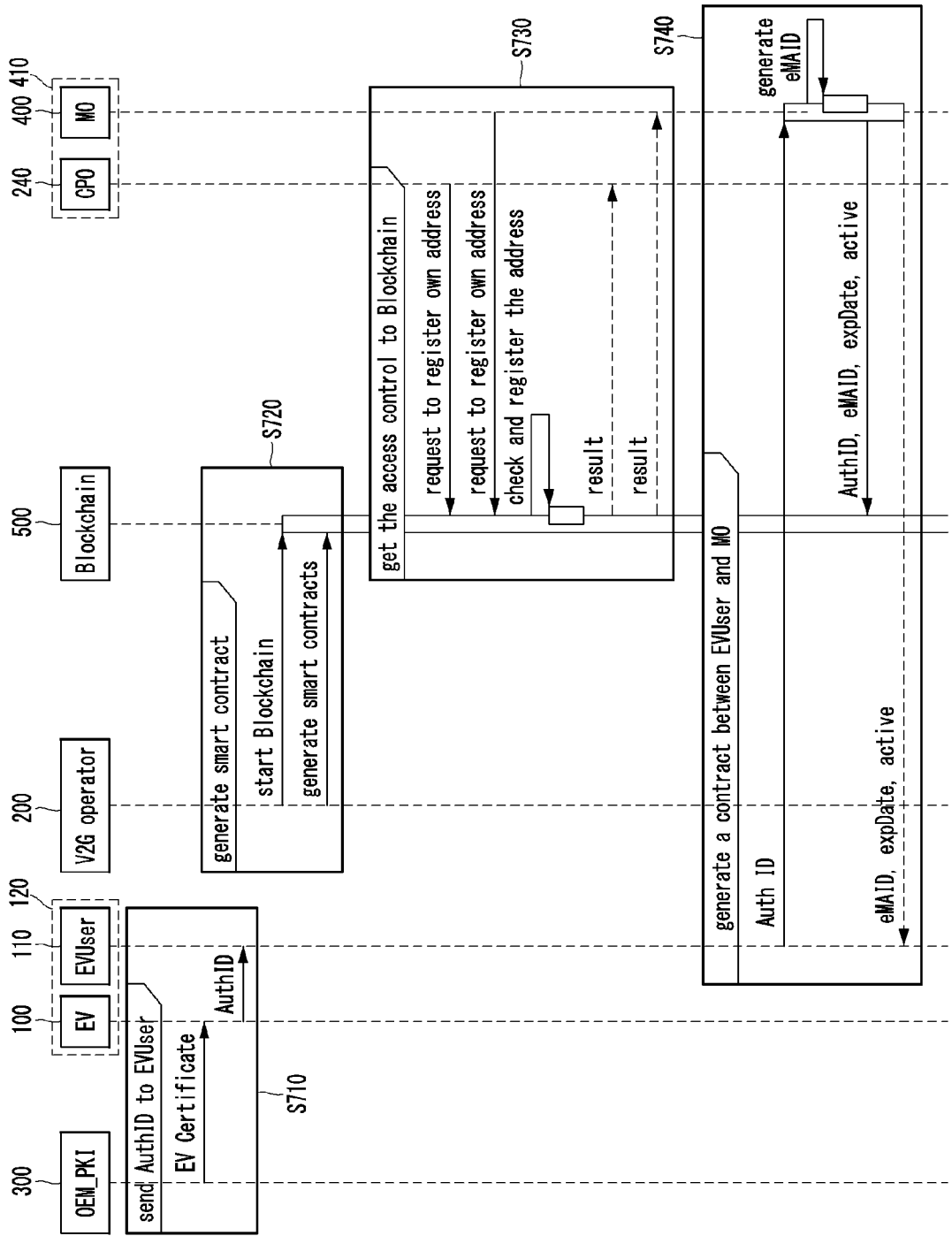
FIG. 7A is a sequence diagram showing an authentication procedure in the blockchain-based automatic authentication system according to an exemplary embodiment of the present disclosure.
Figure 7B:
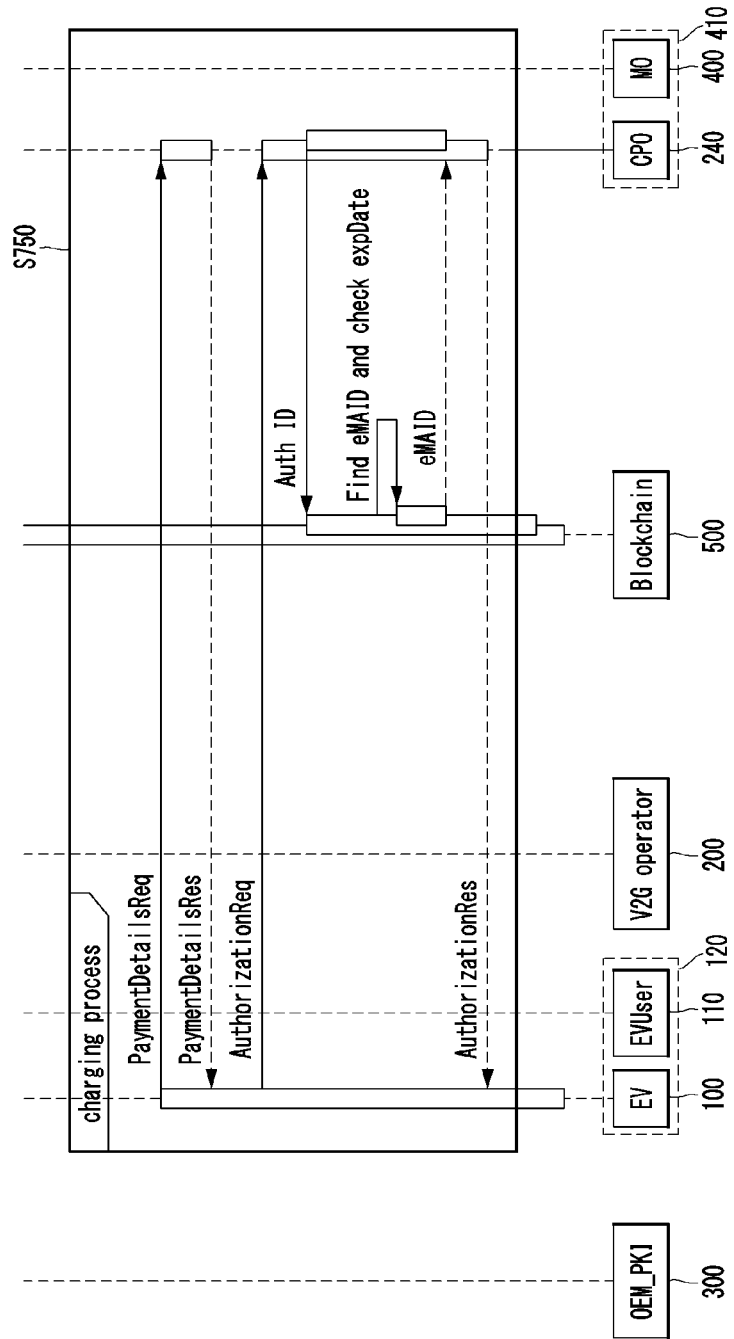
FIG. 7B is a sequence diagram showing an authorization procedure in the blockchain-based automatic authentication system according to an exemplary embodiment of the present disclosure.

The automatic user authentication method based on the above-described architecture will now be described with reference to FIGS. 7A and 7B. FIG. 7A is a sequence diagram showing an authentication procedure in the blockchain-based automatic authentication system according to an exemplary embodiment of the present disclosure. FIG. 7B is a sequence diagram showing an authorization procedure in the blockchain-based automatic authentication system according to an exemplary embodiment of the present disclosure.

Referring to FIG. 7A, the blockchain-based automatic charging user authentication method may include a first through a fourth sequences S710-S740.

In the first sequence S710, the EV 100 may receive the EV certificate from the OEM PKI subsystem 300 and provide the authentication identifier (AuthID) of the EV certificate to the EV user 110. The first sequence S710 may include steps for delivering the authentication identifier (AuthID) to the EV user 110.

In the second sequence S720, the V2G operator 200 may activate the blockchain network by using its own blockchain application or an application of the blockchain service provider to generate a contract for an automatic authentication of an EV charging user in the blockchain 500. The contract may be referred to as the 'smart contract' and may include the 'individual contract'. The second sequence S720 may include the above-stated steps for generating the smart contract.

In the present embodiment, the blockchain 500 may refer to a distributed computing-based distributed ledger system in which entities related to the EV charging or the EV charging user authentication such as the EV user, the OEM PKI subsystem, the V2G operator, the CPO, and the MO may store and manage data to be managed in a form segmented into small pieces of data blocks in a distributed data storage environment such that no entity may arbitrarily modify the stored data and anyone may retrieve a result of a change in the stored data. In other words, the data required for the automatic authentication of EV charging user is divided into small pieces of data called blocks, and the divided small data is distributedly stored in and managed by subjects forming a peer-to-peer (P2P) network and connected by links to form a chain. The subjects may be referred to as communication nodes or nodes.

The data to be managed may include the authentication identifier of the EV certificate, the account identifier of the user account, the expiration date of the account identifier, and the activity status of the account identifier. In addition, the distributed data storage environment may include a link-based storage structure of communication nodes based on a peer-to-peer (P2P) topology in which the communication nodes are connected in a shape of a chain. The blockchain 500 may be a public blockchain in which all participants can read and write data and participate in a network activity such as a consensus, a private blockchain placing restrictions on the activities of the participants according to their permissions, or a consortium blockchain which is a hybrid or intermediate type of the public and private blockchains.

In the third sequence S730, the CPO 240 may request the blockchain 500 to register its address and receive a response containing a result for the request. Also, the MO 400 may request the blockchain 500 to register its address and receive a response containing a result for the request. Through the third sequence S730, the CPO 240 and the MO 400 may acquire an access control authority to the blockchain 500. Upon receiving the request from the CPO 240 or the MO 400, the blockchain 500 may check the address registration request from the CPO 240 or the MO 400 before registering the address. The blockchain 500 may provide an address registration result to the entity having requested the registration, i.e., the CPO 240 or the MO 400.

The information of the CPO 240 or the MO 400 that is registered in the blockchain 500 may be an MO identifier or a CPO identifier, respectively, matching the address of the CPO 240 or the MO 400 rather than the address itself. In such a case, at least one of the entities registered in a blockchain-based EV charging user automatic authentication pool may store and manage a lookup table or a similar configuration that stores matching information between the CPO identifier or the MO identifier and the address of the CPO 240 or the MO 400.

In the fourth sequence S740, the EV user 110 using a user terminal may transmit the authentication identifier (AuthID) to the MO 400, and the MO 400 may generate the account identifier (eMAID) based on the authentication identifier (AuthID) received from the EV user 110 and register contract information including the authentication identifier (AuthID), the account identifier (eMAID), the expiration date (expDate), and the activity status in the blockchain 500. The contract is an individual contract and may be related to the automatic authentication of the EV charging user concluded between the EV user 110 and the MO 400. In addition, the MO 400 may transmit the contract information including the authentication identifier (AuthID), the account identifier (eMAID), the expiration date (expDate), and the activity status to the EV user 110.

When the EV user 110 transmits the authentication identifier (AuthID) to the MO 400, the EV user 110 may transmit a contract generation request message including the authentication identifier (AuthID) to the MO 400 via the EV 100 or another terminal and receive the contract information from the MO 400 through a contract generation response message corresponding to the contract generation request message. Meanwhile, the MO 400 may register the account identifier (eMAID) in the blockchain 500 through the distributed interface of the blockchain 500. The distributed interface may facilitate the registration of the account identifier (eMAID) that matches a provisioning certificate ID or the authentication identifier (AuthID) of the EV certificate in the blockchain 500 and may be provided to all entities such as the MO registered with the blockchain-based EV charging user automatic authentication pool according to the present disclosure.

According to the first through fourth sequences S710-S740, the MO 400 and the CPO 240 may register their addresses in the blockchain 500 suitable for the automatic authentication of EV charging user through the distributed interface to acquire the access control authority to the blockchain 500, generate the account identifier based on the authentication identifier received from the EV user 110 when the contract registration request is received, and register the individual contract generated based on the authentication identifier and the account identifier in the blockchain 500. Accordingly, when the EV 100 associated with the EV user 110 visits to the charging station to charge the battery of the EV, the EV 100 may establish a communication channel with the EVSE 210 according to a predetermined frequency or scheme to make the EVSE 210 to perform the charging process through the automatic authentication process for EV charging based on the individual contract.

Referring to FIG. 7B, once the individual contract between the EV user 110 and the MO 400 is registered in the blockchain 500, the EV 100 may proceed with the charging process including the automatic authentication of the charging user with the EVSE 650 connected to the CPO 240 registered in the blockchain 500. The charging process may be performed by the conductive charging, the wireless power transmission or according to another scheme prescribed in an international standard or a national standard for the wireless charging, AC charging, DC charging, and so on. For example, the charging process may be performed according to a communication procedure conforming to the ISO 15118 standard which is one of the international standards.

During the charging process, the EV 100 may transmit a payment details request (PaymentDetailsReq) message to the CPO 240 and receive a payment details response (PaymentDetailsRes) message from the CPO 240. In addition, the EV 100 may transmit an authorization request (AuthorizationReq) message to the CPO 240 and receive an authorization response (AuthorizationRes) message from the CPO 240. Upon receiving the authorization request message from the EV 100, the CPO 240 may transmit the authentication identifier (AuthID) or a message including the authentication identifier, e.g. a contract verification request message, to the blockchain 500 and receive a contract verification response message corresponding to the contract verification request message from the blockchain 500. The contract verification response message may include the account identifier (eMAID). Subsequently, the CPO 240 may transmit the account identifier (eMAID) received from the blockchain 500 or an authorization response message including the account identifier (eMAID) the EV 100.

In particular, the blockchain 500 may find the account identifier (eMAID) corresponding to the authentication identifier (AuthID) received from the CPO 240 and check the expiration date (expDate) of the account identifier (eMAID) to provide the account identifier (eMAID) or the authorization response message to the CPO 240 only when the expiration date indicates that the account identifier (eMAID) is valid. Afterwards, the EV 100 may proceed with the charging process with the EVSE 210 according to a communication procedure conforming to the ISO 15118 standard to receive power from the EVSE 210 and charge the battery.

When the EV 100 is connected to the charging device or the EVSE through a prescribed communication channel, the EV 500 may perform the automatic authentication of EV charging user by use of the authentication identifier (AuthID) registered in the blockchain 500 or the individual contract including the authentication identifier and may perform the EV charging process simply and safely. As described above, the CPO 240 connected to the EVSE 210 or the MO 400 associated with the CPO 240 may register its address as well as the account identifier (eMAID) corresponding to the authentication identifier or the individual contract with the EV user 110 in the blockchain 500 for the automatic EV charging user authentication. Afterwards, when the EV 100 requests the PnC charging, the automatic authentication and authorization of the EV user 110 may be performed effectively based on the account identifier (eMAID) registered in the blockchain 500 or the individual contract.

In the exemplary embodiments described above, the EV user 110 may include a user terminal of the EV user 110, and the user terminal may be integrally mounted in the EV similarly to a telematics device or may be implemented in a separate device similarly to a mobile terminal. The EV 100 may include the automatic authentication apparatus according to an exemplary embodiment of the present disclosure. In addition, the EV user 110 is not limited to an independent entity separate from the EV 100 but may form a single component 120 integrated with the EV 100. For example, all functions and roles of the EV user 110 may be implemented in hardware, software, or a combination thereof similarly to an autonomous vehicle at least temporarily and may be integrally mounted in the EV 100.

Additionally, although the CPO 240 and the MO 400 have been described above as if they are separate components independent from each other, the CPO 240 may be included in the MO 400 or the CPO 240 may include the MO 400. In such an embodiment, a single component 410 in which the CPO 240 and the MO 400 are combined may include the blockchain-based automatic authentication apparatus of the present embodiment.

Figure 8:
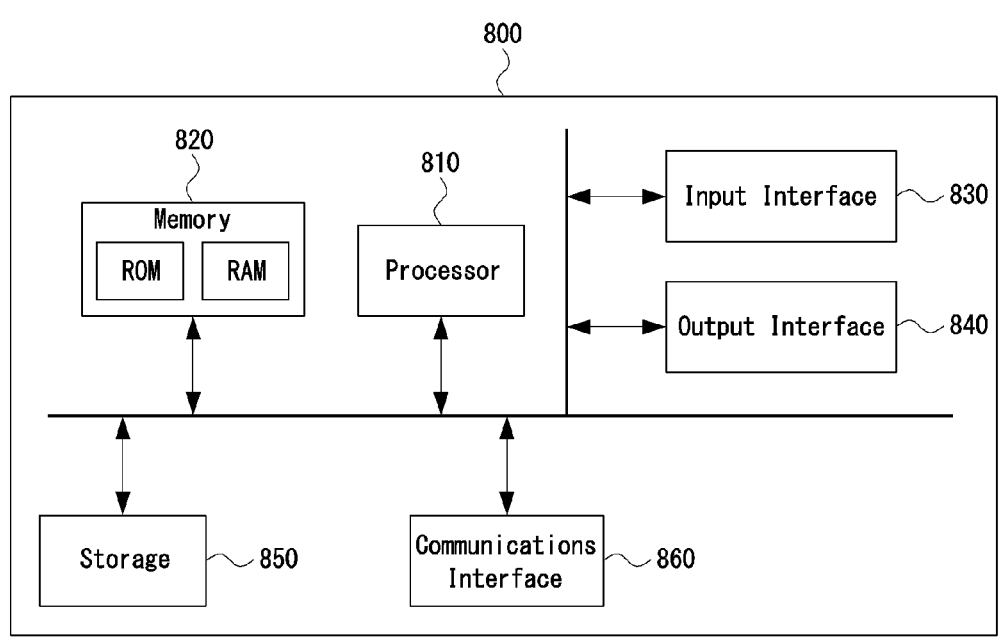
FIG. 8 is a block diagram of a blockchain-based automatic authentication apparatus according to an exemplary embodiment of the present disclosure.

FIG. 8 is a block diagram of a blockchain-based automatic authentication apparatus according to an exemplary embodiment of the present disclosure. The blockchain-based automatic authentication apparatus 800 according to an exemplary embodiment of the present disclosure includes at least one processor 810 and a memory 820 for storing program instructions to be executed by the processor. The program instructions may include program instructions to implement the blockchain-based automatic authentication method. The blockchain-based automatic authentication apparatus 800 may further include an input interface 830, an output interface 840, and a storage 850, and a communication interface 860. The processor 810, the memory 820, the input interface device 830, the output interface device 840, the storage 850, and the communication interface 860 may be connected to each other through an internal bus, an intranet, or Internet to communicate with each other.

The processor 810 may execute the program instructions stored in the memory 820 and/or the storage 850. The processor 810 may include a central processing unit (CPU) or a graphics processing unit (GPU), or may be implemented by another kind of dedicated processor suitable for performing the methods of the present disclosure.

The memory 820 may load the program instructions stored in the storage 850 to provide to the processor 810. The memory 820 may include, for example, a volatile memory such as a read only memory (ROM) and a nonvolatile memory such as a random access memory (RAM).

The input interface 830 may include a keyboard, a mouse, a touch screen, a voice input device, and the like. The output interface 840 may include a display device.

The storage 850 may store the program instructions that may be loaded to the memory 820 and executed by the processor 810. The storage 850 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

The program instructions stored in the storage 850 may include program instructions to implement the blockchain-based automatic authentication method. The program instructions, when executed by the processor, may cause the processor to provide the MO with the authentication identifier suitable for the identification of the EV certificate, request and receive payment details from the CPO based on the contract information received from the MO, start the blockchain, generate the smart contract in the blockchain, request the registration of the address of the MO in the blockchain, generate the account identifier (eMAID) based on the authentication identifier, generate the individual contract between MO and the EV user in the blockchain based on the account identifier, request the registration of the address of the CPO in the blockchain, process the authorization of the EV charging, or check whether the authorization request includes a valid account identifier based on the individual contract stored in the blockchain In addition, the program instructions for the automatic authentication may include instructions required to implement at least some part of the processes shown in FIGS. 7A and 7B. Such program instructions may be executed by the processor 810 in a state of being loaded into the memory 820 to implement the automatic EV charging user authentication method according to the present disclosure.

The communication interface 860 may support a communications system or a communication scheme of a network connecting the CSO, the V2G operator, the MO, the CSP, the eMobility service provider (EMP), the CPO, the EV, the EVCC, and a combination thereof.

Examples of the communications system supported by the communication interface 860 may include a long-term evolution (LTE) communications system commonly abbreviated by '4G system', an LTE-Advanced (LTE-A) system, a new radio (NR) system commonly abbreviated by '5G system'.

The 4G communications system may support the communications in a frequency band of 6 GHz or lower, while the 5G communications system may support the communications in a frequency band of 6 GHz or lower as well as a frequency band higher than 6 GHz. However, the communications system to which the embodiments according to the present disclosure are applicable is not limited thereto. The term 'a communications system' as used herein may refer to a communication network. The term 'LTE' as used herein may refer to the '4G communications system', 'LTE communications system', or 'LTE-A communications system', and the term 'NR' as used herein may refer to the '5G communications system' or 'NR communications system'.

In addition, the communication system supported by the communication interface 860 may include a wireless local area network (WLAN) system. The WLAN system may include an access point (AP), a station, an AP multi-link device (MLD), a non-AP MLD, or a combination thereof. A station may refer to an STA or a non-AP STA. The operating channel width supported by the access point or station may be 20 MHz, 80 MHz, 160 MHz, or the like.

In the examples described above, the communication interface 860 may include a cellular communications subsystem suitable for supporting the 4G or 5G communications system or a wireless LAN communications subsystem suitable for supporting the wireless LAN system, for example.

Figure 9:
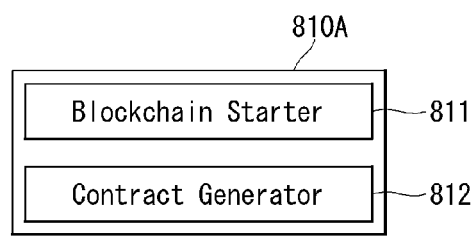
FIG. 9 is a block diagram of a vehicle-to-grid (V2G) operator that may be employed in a blockchain-based automatic authentication system according to an exemplary embodiment of the present disclosure.

FIG. 9 is a block diagram of the V2G operator that may be employed in a blockchain-based automatic authentication system according to an exemplary embodiment of the present disclosure. The V2G according to the present embodiment may include a blockchain starter 811 and a contract generator 812 in addition to a basic configuration of the blockchain-based automatic authentication apparatus shown in FIG. 8. The blockchain starter 811 and the contract generator 812 may be program instances or modules stored in the memory 820 or the storage 850 and executed by the processor 810A. When being executed by the processor 810A, the blockchain starter 811 and the contract generator 812 may generate the smart contract in the blockchain. In an alternative embodiment, the blockchain starter 811 and the contract generator 812 may be mounted in the upper-level server or a separate authentication server rather than the V2G operator.

The blockchain starter 811 may be configured to execute instructions for the V2G operator to start the blockchain on the network. In an exemplary embodiment, the blockchain starter 811 may be implemented by an application program interface (API) managed by an operating system of the V2G operator. In such a case, the operating system may provide a high-level command to the API to control an operation of the application module, i.e. the blockchain starter 811. The processor 810A may identify the application module corresponding to the high-level command, decode the high-level command by using a high-level command processing unit, and provide a decoded high-level command to an application module controller, so that the application module controller convert the decoded high-level command into a form that may be recognized by the application module and may control the application module. As a result, the blockchain starter 811 may start the blockchain by a blockchain application executed in the V2G operator.

The contract generator 812 may be configured to execute instructions to enable the V2G operator to generate a contract on the blockchain. In detail, the contract generator 812 may be configured to generate the smart contract on the blockchain for the automatic authentication of the EV charging user according to the present disclosure. The smart contract may store procedures and rules for the automatic authentication of the EV charging user based on the blockchain in the distributed ledger, and may be converted into the individual contract according to the registration of the MO, the registration of the CPO, and an updating of the contract information between the MO and the EV user.

In the present embodiment, after the smart contract is generated, the V2G operator, or an application distributor associated with the V2G operator may provide a distributed interface for accessing the blockchain network to the MO, the CSP, the EMP, the CPO, or the CSO. Meanwhile, the automatic authentication apparatus according to the present embodiment may be implemented to interface with the V2G operator or the application distributor and provide the distributed interface to each entity via the V2G operator or the application distributor. Alternatively, however, the automatic authentication apparatus of the present embodiment may be implemented to provide the distributed interface directly to an entity that is to access the blockchain after generation of the smart contract by the V2G operator.

Figure 10:
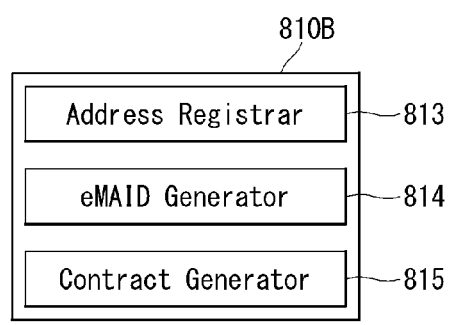
FIG. 10 is a block diagram of a mobility operator (MO), a charge service provider (CSP), or a e-mobility service provider (EMP) that may be employed in a blockchain-based automatic authentication system according to an exemplary embodiment of the present disclosure.

FIG. 10 is a block diagram of the MO, the CSP, or the EMP that may be employed in a blockchain-based automatic authentication system according to an exemplary embodiment of the present disclosure. The MO, the CSP, or the EMP according to the present embodiment may include an address registrar 813, an eMAID generator 814, and a contract generator 815 in addition to the basic configuration of the blockchain-based automatic authentication apparatus shown in FIG. 8. The address registrar 813, the eMAID generator 814, and the contract generator 815 may be program instances or modules stored in the memory 820 or the storage 850 and executed by the processor 810B. When being executed by the processor 810B, the address registrar 813, the eMAID generator 814, and the contract generator 815 may control an access to the blockchain and generate an individual contract with the EV user. In an alternative embodiment, the address registrar 813, the eMAID generator 814, and the contract generator 815 may be mounted in the upper-level server or a separate server rather than the MO, the CSP, or the EMP.

The address registrar 813 may be configured to enable the MO, the CSP, or the EMP to register their address in the blockchain. The address registrar 813 may transmit a first address registration request message to the blockchain and receive a first address registration response message including an address registration result from the blockchain. The eMAID generator 814 may be configured to generate the account identifier (eMAID) based on the authentication identifier received from the EV user. In addition, the eMAID generator 814 may handle instructions related to the function or operations of generating the account identifier in the MO, the CSP, or the EMP.

The contract generator 815 may be configured to handle instructions suitable for generating a contract (hereinbelow, abbreviated by 'automatic authentication contract') for use in the automatic authentication of EV charging user on the blockchain based on the account identifier generated by the eMAID generator 814. The contract generator 815 may send the authentication identifier, the contract identifier, and the expiration data and activity status of the contract identifier to the blockchain, so that the blockchain may generate the automatic authentication contract with the EV user.

In addition, the MO, the CSP, or the EMP having the processor 810B may further include a configuration or a software module suitable for transmitting contract information, used in the automatic authentication contract, such as the contract identifier, and the expiration data and activity status to the EV user.

Figure 11:
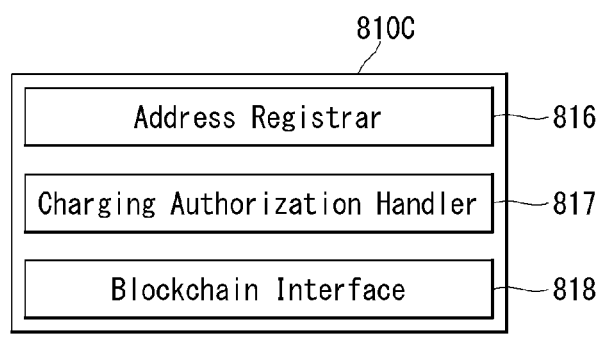
FIG. 11 is a block diagram of a charge point operator (CPO) or a charging station operator (CSP) that may be employed in a blockchain-based automatic authentication system according to an exemplary embodiment of the present disclosure.

FIG. 11 is a block diagram of the CPO or the CSO that may be employed in a blockchain-based automatic authentication system according to an exemplary embodiment of the present disclosure. The CPO or the CSO according to the present embodiment may include an address registrar 816, a charging authorization handler 817, and a blockchain interface 818 in addition to the basic configuration of the blockchain-based automatic authentication apparatus shown in FIG. 8. The address registrar 816, the charging authorization handler 817, and the blockchain interface 818 may be program instances or modules stored in the memory 820 or the storage 850 and executed by the processor 810C. When being executed by the processor 810C, the charging authorization handler 817, and the blockchain interface 818 may handle and respond to the authorization request message from the EV. In an alternative embodiment, the address registrar 816, the charging authorization handler 817, and the blockchain interface 818 may be mounted in the upper-level server or a separate server rather than the CPO or the CSO.

The address registrar 816 may be configured to enable the CPO or the CSO to register their address in the blockchain. The address registrar 816 may transmit a second address registration request message to the blockchain and receive a second address registration response message including an address registration result from the blockchain.

The charging authorization handler 817 may be configured to handle the instructions for processing the authorization request message, a content of the request message, and the authorization response message when the CPO or the CSO receives the authorization request message associated with the automatic authentication of the charging user from the EV. The charging authorization handler 817 may receive the authorization request message from the EV, transmit the authentication identifier corresponding to the authorization request message to the blockchain, and receive the account identifier retrieved from the blockchain and having a verified validity period. In addition, the charging authorization handler 817 may transmit the authorization response message to the EV based on the valid account identifier.

The blockchain Interface 818 may be interfaced with the charging authorization handler 817 and may be configured to support a connection and data exchange between the charging authorization handler 817 and the blockchain.

Additionally, the CPO or the CSO including the processor 810C may automatically transmit an automatic authentication result or an authorization result corresponding to the automatic authentication to a charging manager of the EVSE or the SECC of the EVSE managing the power transfer of the EV.

Figure 12:
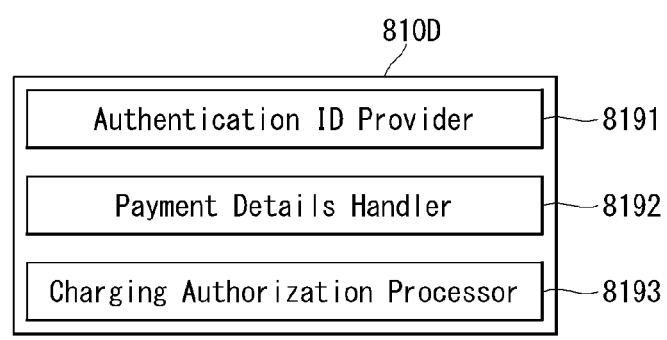
FIG. 12 is a block diagram of an electric vehicle (EV) or an electric vehicle communication controller (EVCC) that may be employed in a blockchain-based automatic authentication system according to an exemplary embodiment of the present disclosure.

FIG. 12 is a block diagram of the EV or an electric vehicle communication controller (EVCC) that may be employed in a blockchain-based automatic authentication system according to an exemplary embodiment of the present disclosure. The EV or the EVCC to the present embodiment may include an authentication ID provider 8191, a payment details handler 8192, and a charging authorization processor 8193 in addition to the basic configuration of the blockchain-based automatic authentication apparatus shown in FIG. 8. The authentication ID provider 8191, the payment details handler 8192, and the charging authorization processor 8193 may be program instances or modules stored in the memory 820 or the storage 850 and executed by the processor 810D. When being executed by the processor 810D, the authentication ID provider 8191, the payment details handler 8192, and the charging authorization processor 8193 may handle the automatic authentication request message from the EV. In an alternative embodiment, the authentication ID provider 8191, the payment details handler 8192, and the charging authorization processor 8193 may be mounted in the upper-level server or a separate server rather than the EV or the EVCC.

The authentication ID provider 8191 may be configured to handle instructions for the EV to provide the authentication identifier to the EV user when the EV receives the EV certificate from the OEM PKI subsystem. The authentication ID provider 8191 may receive the EV certificate from the OEM PKI subsystem, generate the authentication identifier that may be the same as the identifier of the EV certificate, and provide the authentication identifier to the EV user. In addition, when the EV performing at least some functions of the EV user provide the authentication identifier to the MO, the authentication ID provider 8191 may process a procedure for generating the contract with the MO or relevant messages or instructions. The authentication ID provider 8191 may transmit the authentication identifier to the MO and may receive the contract information from the MO.

The contract information refers to the information related to the contract generated on the blockchain based on the account identifier created by the MO based on the authentication identifier. The contract information may include the account identifier corresponding to the authentication identifier, an expiration date of the account identifier, and the activity status having a value of 'true' or 'false' depending on whether the account identifier is valid or not.

The payment details handler 8192 may be configured to process instructions related to the payment for the charging fee between the EV and the CPO in a state that the EV retaining the contract information establishes a communication channel for the charging process at the charging station or the like. The payment details handler 8192 may transmit the payment details request message formulated by the EV to the CPO and receive the payment details response message including the payment details from the CPO.

The charging authorization processor 8193 may be configured to process instructions for obtaining the authorization for automatic charging for the EV from the CPO in a state that the EV retaining the contract information establishes a communication channel for the charging process at the charging station or the like. The charging authorization processor 8193 may transmit the authorization request message to the CPO and receive the authorization response message from the CPO. Upon receiving the authorization request message, the CPO may transmit the authentication identifier corresponding to the authorization request message to the blockchain, receive the account identifier retrieved from the blockchain and having a verified validity period, and transmit the authorization response message including the authorization result, e.g. an approval or disapproval of the charging, according to the validity of the account identifier to the EV.

Additionally, the EV or the EVCC including the processor 810D may proceed with the charging process through communications between the EV and the EVSE based on the authorization response message including authorization-related information, so that the power supplied from the EVSE may charge the battery of the EV.

As mentioned above, the apparatus and method according to exemplary embodiments of the present disclosure may be implemented by computer-readable program codes or instructions stored on a non-transitory computer-readable recording medium. The non-transitory computer-readable recording medium includes all types of recording media storing data readable by a non-transitory computer system. The computer-readable recording medium may be distributed over computer systems connected through a network so that a computer-readable program or code may be stored and executed in a distributed manner.

The non-transitory computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto. In particular, blocks or the device corresponds to operations of the method or characteristics of the sequences of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some exemplary embodiments, at least one of most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An automatic authentication apparatus of an electric vehicle (EV) user based on a blockchain, the automatic authentication apparatus being associated with at least one of a mobility operator (MO) or a charge point operator (CPO), the automatic authentication apparatus comprising:
at least one processor; and
at least one memory storing at least one instruction to be executed by the at least one processor,
wherein the at least one instruction, when executed by the at least one processor, causes the at least one processor to:
receive an authentication identifier from an EV or a user terminal of the EV user;
generate an account identifier of the EV user based on the authentication identifier;
generate an individual contract, on the blockchain of a network, based on the authentication identifier, the account identifier, an expiration date of the account identifier, and an activity status of the account identifier;

transmit contract information including the account identifier, the expiration date of the account identifier, and the activity status of the account identifier to the EV or the user terminal; and communicate with the EV retaining the contract information, the EV configured to establish a communication channel to execute charging of the EV at a charging station and the EV configured to arrange to charge a battery of the EV by an electric vehicle supply equipment (EVSE) at the charging station.

2. The apparatus of claim 1, wherein the blockchain is subscribed in advance or newly started or created by a vehicle-to-grid (V2G) operator, wherein the V2G operator generates a smart contract associated with the EV or the EV user on the blockchain, wherein the smart contract stores a set of rules for an automatic authentication of the EV user in a distributed ledger of the blockchain.

3. The apparatus of claim 2, wherein the at least one instruction, when executed by the at least one processor, further causes the at least one processor to:

transmit a registration request message for an address of the MO or the CPO to the blockchain, wherein the blockchain verifies the address of the MO or the CPO according to the set of rules in the smart contract and to register in a distributed ledger of the blockchain.

4. The apparatus of claim 3, wherein the at least one instruction, when executed by the at least one processor, further causes the at least one processor to:

receive a payment details request message from the EV; and transmit a payment details response message to the EV.

5. The apparatus of claim 4, wherein the at least one instruction, when executed by the at least one processor, further causes the at least one processor to:

receive an authorization request message related to the automatic authentication of the EV user from the EV;

transmit the authentication identifier included in the authorization request message or acquired based on the authorization request message to the blockchain;

receive the account identifier corresponding to the authentication identifier and having a verified expiration date from the blockchain; and transmit an authorization response message to the EV based on the account identifier.

6. The apparatus of claim 1, wherein the authentication identifier is generated based on an EV certificate obtained by the EV from a public key infrastructure (PKI) of an original equipment manufacturer (OEM).

7. A method of automatically authenticating an electric vehicle (EV) user, comprising:

receiving, by a mobility operator (MO), an authentication identifier from an EV or a user terminal of the EV user;

generating, by the MO, an account identifier of the EV user based on the authentication identifier;

generating, by the MO, an individual contract including the authentication identifier, the account identifier, an expiration date of the account identifier, and an activity status of the account identifier on a blockchain on a network;

transmitting, by the MO, contract information including the account identifier, the expiration date, and the activity status to the EV or the user terminal;

establishing a communication channel, by the EV retaining the contract information, to execute charging of the EV at a charging station; and charging, by an electric vehicle supply equipment (EVSE), a battery of the EV at the charging station.

8. The method of claim 7, further comprising:

generating, by a vehicle-to-grid (V2G) operator, a contract associated with the EV or the EV user on the blockchain, wherein the blockchain is subscribed in advance or newly started or created by the V2G operator, wherein the contract stores a set of rules for an automatic authentication of the EV user in a distributed ledger of the blockchain.

9. The method of claim 8, further comprising:

transmitting, by the MO, a registration request message for an address of the MO to the blockchain, wherein the blockchain verifies the address of the MO according to the rules in the contract and registers the address of the MO in the distributed ledger.

10. The method of claim 9, further comprising:

transmitting, by a charge point operator (CPO) associated with the MO, a registration request message for an address of the CPO to the blockchain, wherein the blockchain verifies the address of the CPO according to the rules in the contract and registers the address of the CPO in the distributed ledger.

11. The method of claim 10, further comprising:

receiving, by the CPO, a payment details request message from the EV; and transmitting, by the CPO, a payment details response message including payment details to the EV.

12. The method of claim 10, further comprising:

receiving, by the CPO, an authorization request message related to an automatic authentication of the EV user from the EV;

transmitting, by the CPO, the authentication identifier included in the authorization request message or acquired based on the authorization request message to the blockchain;

receiving, by the CPO, the account identifier corresponding to the authentication identifier and having a verified expiration date from the blockchain; and transmitting, by the CPO, an authorization response message to the EV based on the account identifier.

13. The method of claim 7, wherein the authentication identifier is generated based on an EV certificate obtained from a public key infrastructure (PKI) of an original equipment manufacturer (OEM).

14. A method of automatically authenticating an electric vehicle (EV) user based on a blockchain, the method comprising:

generating, by an EV, an authentication identifier based on an EV certificate;

transmitting, by the EV, the authentication identifier to a mobility operator (MO);

establishing, by the EV, a communication channel with an electric vehicle supply equipment (EVSE) of a charge point operator (CPO) associated with the MO to transmit and receive signals and data to and from the EVSE;

transmitting, by the EV, an authorization request message related to an automatic authentication of the EV user to the CPO through the communication channel;

receiving, by the EV, an authorization response message corresponding to the authorization request message from the CPO;

wherein the communication channel is established by the EV retaining that retains contract information, to execute charging of the EV at a charging station; and charging, by the EVSE, a battery of the EV at the charging station, wherein the MO generates an account identifier based on the authentication identifier, generates an individual contract on the blockchain based on the authentication identifier, the account identifier, an expiration date of the account identifier, and an activity status of the account identifier, and transmits the contract information associated with the individual contract to the EV or the EV user.

15. The method of claim 14, wherein the CPO transmits the authentication identifier included in the authorization request message or acquired based on the authorization request message to the blockchain, wherein the CPO transmits the authorization response message to the EV or the EV user based on the account identifier retrieved from the blockchain and having a verified expiration date.

16. The method of claim 14, wherein the EV certificate is obtained from a public key infrastructure (PKI) of an original equipment manufacturer (OEM).

17. The method of claim 14, wherein when a V2G operator generates a contract related with the EV or the EV user on the blockchain of a network, the MO or the CPO transmits a registration request message for an address of the MO or the CPO, respectively, to the blockchain, wherein the blockchain verifies the address of the MO or the CPO according to a set of rules in the contract and registers a verified address of the MO or the CPO in a distributed ledger of the blockchain.

18. A method of automatically authenticating an electric vehicle (EV) user based on a blockchain performed by an EV automatic authentication apparatus comprising a processor and a memory storing at least one instruction to be executed by the processor, the EV automatic authentication apparatus being associated with at least one of a mobility operator (MO) or a charge point operator (CPO), the method comprising:

acquiring, by the EV automatic authentication apparatus, an access control authority to the blockchain in a state that a contract between a vehicle-to-grid (V2G) operator and an EV or the EV user is generated on the blockchain of a network by the V2G operator;

generating, by the EV automatic authentication apparatus, an account identifier based on an authentication identifier received from the EV or the EV user;

generating, by the EV automatic authentication apparatus, an individual contract on the blockchain, based on the authentication identifier and the account identifier;

transmitting, by the EV automatic authentication apparatus, contract information related to the individual contract to the EV or the EV user;

establishing a communication channel, by the EV retaining the contract information, to execute charging of the EV at a charging station; and charging, by an electric vehicle supply equipment (EVSE), a battery of the EV at the charging station.

19. The method of claim 18, further comprising:

receiving a payment details request message from the EV via the MO connected to the EVSE having established the communication channel with the EV; and transmitting a payment details response message comprising payment details data to the EV.

20. The method of claim 18, further comprising:

receiving an authorization request message from the EV;

transmitting the authentication identifier included in the authorization request message or corresponding to the authorization request message to the blockchain;

receiving the account identifier corresponding to the authentication identifier from the blockchain; and transmitting an authorization response message to the EV based on the account identifier.

\* \* \* \* \*